United States Patent
Elshafie et al.

(10) Patent No.: US 11,728,842 B2
(45) Date of Patent: Aug. 15, 2023

(54) TECHNIQUES FOR USING MULTIPLE SYMBOLS TO PROVIDE FEEDBACK FOR A SIDELINK TRANSMISSION

(71) Applicant: QUALCOMM Incorporated, San Diego, CA (US)

(72) Inventors: Ahmed Elshafie, San Diego, CA (US); Wei Yang, San Diego, CA (US); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/521,392

(22) Filed: Nov. 8, 2021

(65) Prior Publication Data

US 2023/0147447 A1    May 11, 2023

(51) Int. Cl.
*H04W 92/18*    (2009.01)
*H04B 1/713*    (2011.01)

(52) U.S. Cl.
CPC .................................. *H04B 1/713* (2013.01)

(58) Field of Classification Search
CPC .. H04B 7/2637; H04B 17/318; H04B 7/0617; H04B 7/0695; H04B 17/327; H04B 17/382; H04B 7/0413; H04B 7/0456; H04W 92/18; H04W 4/40; H04W 72/0406; H04W 72/02; H04W 72/0446; H04W 76/14; H04W 72/14; H04W 72/1278; H04L 1/1812; H04L 5/0053; H04L 1/18; H04L 5/00; H04L 5/0055; H04L 1/1896; H04L 1/1854; H04L 5/0007; H04L 5/0094
USPC ......................................................... 375/133
See application file for complete search history.

(56) References Cited

U.S. PATENT DOCUMENTS

| | | | | |
|---|---|---|---|---|
| 2021/0185715 | A1* | 6/2021 | Shen | H04L 5/0023 |
| 2021/0288778 | A1* | 9/2021 | Park | H04L 1/1858 |
| 2022/0264529 | A1* | 8/2022 | Yang | H04L 1/1858 |
| 2022/0286179 | A1* | 9/2022 | Hosseini | H04B 7/0626 |

* cited by examiner

*Primary Examiner* — Eva Y Puente
(74) *Attorney, Agent, or Firm* — Holland & Hart LLP

(57) ABSTRACT

Methods, systems, and devices for wireless communication are described to support increasing a sidelink feedback channel reliability. A second user equipment (UE) may transmit a sidelink message to a first UE, and the first UE may provide feedback for the sidelink message via an associated feedback opportunity. The first UE may perform frequency hopping from one symbol to another during the feedback opportunity, may transmit the feedback using multiple physical resource blocks (PRBs) within one symbol of the feedback opportunity, or both. A pattern for frequency hopping, or for the multiple PRBs, or both, may be defined or determined by a base station, the first UE, the second UE, or any combination thereof. In some cases, a pattern for frequency hopping or for PRB bundling may be defined or preconfigured at the first UE, the second UE, or both.

25 Claims, 13 Drawing Sheets

TECHNIQUES FOR USING MULTIPLE SYMBOLS TO PROVIDE FEEDBACK FOR A SIDELINK TRANSMISSION

TECHNICAL FIELD

The following relates to wireless communication, including techniques for using multiple symbols to provide feedback for a sidelink transmission.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE). Components within a wireless communication system may be coupled (for example, operatively, communicatively, functionally, electronically, and/or electrically) to each other.

A UE may communicate with one or more other UEs via sidelink transmissions. After attempting to receive a sidelink message, a receiving UE may transmit feedback for the sidelink message to a transmitting UE.

SUMMARY

The described techniques relate to improved methods, systems, devices, and apparatuses that support techniques for using multiple symbols to provide feedback for a sidelink transmission. Generally, the described techniques provide for increasing a sidelink feedback channel reliability. A second user equipment (UE) may transmit a sidelink message to a first UE, and the first UE may provide feedback for the sidelink message via an associated feedback opportunity. The first UE may increase a reliability of the feedback by performing frequency hopping (e.g., changing physical resource blocks (PRBs)) from one symbol to another during the feedback opportunity, by transmitting the feedback using multiple PRBs within one symbol of the feedback opportunity (e.g., performing PRB bundling), or both. In some cases, a pattern for frequency hopping or for PRB bundling (e.g., or parameters associated therewith) may be defined or determined by a base station, the first UE, the second UE, or any combination thereof. In some cases, a pattern for frequency hopping or for PRB bundling (e.g., or parameters associated therewith) may be defined or preconfigured (e.g., by a wireless communications standard).

A method for wireless communication at a first UE is described. The method may include monitoring for a sidelink message from a second UE over a sidelink shared channel that is associated with a feedback opportunity that includes a set of multiple symbols, determining a frequency hopping pattern for transmission of feedback via the set of multiple symbols during the feedback opportunity, and transmitting the feedback for the sidelink message to the second UE via the set of multiple symbols of the feedback opportunity in accordance with the frequency hopping pattern.

An apparatus for wireless communication at a first UE is described. The apparatus may include at least one processor, memory coupled (e.g., operatively, communicatively, functionally, electronically, or electrically) to the at least one processor. The memory may store instructions executable by the at least one processor to cause the apparatus to monitor for a sidelink message from a second UE over a sidelink shared channel that is associated with a feedback opportunity that includes a set of multiple symbols, determine a frequency hopping pattern for transmission of feedback via the set of multiple symbols during the feedback opportunity, and transmit the feedback for the sidelink message to the second UE via the set of multiple symbols of the feedback opportunity in accordance with the frequency hopping pattern.

Another apparatus for wireless communication at a first UE is described. The apparatus may include means for monitoring for a sidelink message from a second UE over a sidelink shared channel that is associated with a feedback opportunity that includes a set of multiple symbols, means for determining a frequency hopping pattern for transmission of feedback via the set of multiple symbols during the feedback opportunity, and means for transmitting the feedback for the sidelink message to the second UE via the set of multiple symbols of the feedback opportunity in accordance with the frequency hopping pattern.

A non-transitory computer-readable medium storing code for wireless communication at a first UE is described. The code may include instructions executable by a processor to monitor for a sidelink message from a second UE over a sidelink shared channel that is associated with a feedback opportunity that includes a set of multiple symbols, determine a frequency hopping pattern for transmission of feedback via the set of multiple symbols during the feedback opportunity, and transmit the feedback for the sidelink message to the second UE via the set of multiple symbols of the feedback opportunity in accordance with the frequency hopping pattern.

In some examples of the method, apparatuses, and non-transitory computer-readable medium described herein, determining the frequency hopping pattern may include operations, features, means, or instructions for receiving, from a base station, an indication of the frequency hopping pattern.

In some examples of the method, apparatuses, and non-transitory computer-readable medium described herein, determining the frequency hopping pattern may include operations, features, means, or instructions for receiving, from a base station, one or more parameters to be used by the first UE in determining the frequency hopping pattern.

In some examples of the method, apparatuses, and non-transitory computer-readable medium described herein, determining the frequency hopping pattern may include operations, features, means, or instructions for determining a set of multiple PRBs for transmission of the feedback in accordance with the frequency hopping pattern, where each PRB of the set of multiple PRBs may be associated with both a respective symbol of the set of multiple symbols and a PRB index, where the PRB index may be based on a PRB offset for the respective symbol.

In some examples of the method, apparatuses, and non-transitory computer-readable medium described herein, determining the frequency hopping pattern may include operations, features, means, or instructions for determining the PRB index for each of the set of multiple PRBs based on an initial offset that may be UE-specific and that applies to each of the set of multiple symbols.

Some examples of the method, apparatuses, and non-transitory computer-readable medium described herein may further include operations, features, means, or instructions for receiving an indication of the initial offset.

In some examples of the method, apparatuses, and non-transitory computer-readable medium described herein, receiving the indication of the initial offset may include operations, features, means, or instructions for receiving the indication of the initial offset from the second UE, where the initial offset may be UE-specific to the second UE.

Some examples of the method, apparatuses, and non-transitory computer-readable medium described herein may further include operations, features, means, or instructions for transmitting, to the second UE, an additional indication of a preferred initial offset, where receiving the indication of the initial offset may be based on transmitting the additional indication of the preferred initial offset.

Some examples of the method, apparatuses, and non-transitory computer-readable medium described herein may further include operations, features, means, or instructions for selecting the initial offset at the first UE.

In some examples of the method, apparatuses, and non-transitory computer-readable medium described herein, determining the frequency hopping pattern may include operations, features, means, or instructions for applying a staircase algorithm where the PRB offset for each of the set of multiple symbols increments by one PRB index per consecutive symbol of the set of multiple symbols.

In some examples of the method, apparatuses, and non-transitory computer-readable medium described herein, the PRB offset for two consecutive symbols of the set of multiple symbols wraps from a last PRB index to a first PRB index.

In some examples of the method, apparatuses, and non-transitory computer-readable medium described herein, determining the frequency hopping pattern may include operations, features, means, or instructions for applying a bit-reversal permutation algorithm where the PRB offset for each of the set of multiple symbols may be a reversal of a binary representation of each of the set of multiple symbols.

Some examples of the method, apparatuses, and non-transitory computer-readable medium described herein may further include operations, features, means, or instructions for receiving signaling indicating that an algorithm to be used by the first UE to determine the frequency hopping pattern may be based on a resource pool associated with the sidelink shared channel.

Some examples of the method, apparatuses, and non-transitory computer-readable medium described herein may further include operations, features, means, or instructions for receiving signaling indicating an algorithm to be used by the first UE to determine the frequency hopping pattern for all sidelink feedback channel communications associated with any sidelink resource pools.

A method for wireless communication at a second UE is described. The method may include transmitting a sidelink message to a first UE over a sidelink shared channel that is associated with a feedback opportunity that includes a set of multiple symbols, determining a frequency hopping pattern for reception of feedback via the set of multiple symbols during the feedback opportunity, and receiving the feedback for the sidelink message from the first UE via the set of multiple symbols of the feedback opportunity in accordance with the frequency hopping pattern.

An apparatus for wireless communication at a second UE is described. The apparatus may include at least one processor, memory coupled (e.g., operatively, communicatively, functionally, electronically, or electrically) to the at least one processor. The memory may store instructions executable by the at least one processor to cause the apparatus to transmit a sidelink message to a first UE over a sidelink shared channel that is associated with a feedback opportunity that includes a set of multiple symbols, determine a frequency hopping pattern for reception of feedback via the set of multiple symbols during the feedback opportunity, and receive the feedback for the sidelink message from the first UE via the set of multiple symbols of the feedback opportunity in accordance with the frequency hopping pattern.

Another apparatus for wireless communication at a second UE is described. The apparatus may include means for transmitting a sidelink message to a first UE over a sidelink shared channel that is associated with a feedback opportunity that includes a set of multiple symbols, means for determining a frequency hopping pattern for reception of feedback via the set of multiple symbols during the feedback opportunity, and means for receiving the feedback for the sidelink message from the first UE via the set of multiple symbols of the feedback opportunity in accordance with the frequency hopping pattern.

A non-transitory computer-readable medium storing code for wireless communication at a second UE is described. The code may include instructions executable by a processor to transmit a sidelink message to a first UE over a sidelink shared channel that is associated with a feedback opportunity that includes a set of multiple symbols, determine a frequency hopping pattern for reception of feedback via the set of multiple symbols during the feedback opportunity, and receive the feedback for the sidelink message from the first UE via the set of multiple symbols of the feedback opportunity in accordance with the frequency hopping pattern.

In some examples of the method, apparatuses, and non-transitory computer-readable medium described herein, determining the frequency hopping pattern may include operations, features, means, or instructions for receiving, from a base station, an indication of the frequency hopping pattern.

In some examples of the method, apparatuses, and non-transitory computer-readable medium described herein, determining the frequency hopping pattern may include operations, features, means, or instructions for receiving, from a base station, one or more parameters to be used by the second UE in determining the frequency hopping pattern.

In some examples of the method, apparatuses, and non-transitory computer-readable medium described herein, determining the frequency hopping pattern may include operations, features, means, or instructions for determining a set of multiple PRBs for reception of the feedback in accordance with the frequency hopping pattern, where each PRB of the set of multiple PRBs may be associated with both a respective symbol of the set of multiple symbols and a PRB index, where the PRB index may be based on a PRB offset for the respective symbol.

In some examples of the method, apparatuses, and non-transitory computer-readable medium described herein, determining the frequency hopping pattern may include operations, features, means, or instructions for determining the PRB index for each of the set of multiple PRBs based on an initial offset that may be UE-specific and that applies to each of the set of multiple symbols.

Some examples of the method, apparatuses, and non-transitory computer-readable medium described herein may further include operations, features, means, or instructions for transmitting an indication of the initial offset to the first UE, where the initial offset may be UE-specific to the second UE.

Some examples of the method, apparatuses, and non-transitory computer-readable medium described herein may further include operations, features, means, or instructions for receiving, from the first UE, an additional indication of a preferred initial offset, where transmitting the indication of the initial offset may be based on receiving the additional indication of the preferred initial offset.

In some examples of the method, apparatuses, and non-transitory computer-readable medium described herein, determining the frequency hopping pattern may include operations, features, means, or instructions for applying a staircase algorithm where the PRB offset for each of the set of multiple symbols increments by one PRB index per consecutive symbol of the set of multiple symbols.

In some examples of the method, apparatuses, and non-transitory computer-readable medium described herein, the PRB offset for two consecutive symbols of the set of multiple symbols wraps from a last PRB index to a first PRB index.

In some examples of the method, apparatuses, and non-transitory computer-readable medium described herein, determining the frequency hopping pattern may include operations, features, means, or instructions for applying a bit-reversal permutation algorithm where the PRB offset for each of the set of multiple symbols may be a reversal of a binary representation of each of the set of multiple symbols.

Some examples of the method, apparatuses, and non-transitory computer-readable medium described herein may further include operations, features, means, or instructions for receiving signaling indicating that an algorithm to be used by the second UE to determine the frequency hopping pattern may be based on a resource pool associated with the sidelink shared channel.

Some examples of the method, apparatuses, and non-transitory computer-readable medium described herein may further include operations, features, means, or instructions for receiving signaling indicating an algorithm to be used by the second UE to determine the frequency hopping pattern for all sidelink feedback channel communications associated with any sidelink resource pools.

A method for wireless communication at a first UE is described. The method may include monitoring for a sidelink message from a second UE over a sidelink shared channel that is associated with a feedback opportunity, determining that the first UE is configured to transmit feedback for the sidelink message via a set of multiple bundled PRBs during a symbol of the feedback opportunity, and transmitting the feedback for the sidelink message to the second UE via the set of multiple bundled PRBs of the symbol of the feedback opportunity.

An apparatus for wireless communication at a first UE is described. The apparatus may include at least one processor, memory coupled (e.g., operatively, communicatively, functionally, electronically, or electrically) to the at least one processor. The memory may store instructions executable by the at least one processor to cause the apparatus to monitor for a sidelink message from a second UE over a sidelink shared channel that is associated with a feedback opportunity, determine that the first UE is configured to transmit feedback for the sidelink message via a set of multiple bundled PRBs during a symbol of the feedback opportunity, and transmit the feedback for the sidelink message to the second UE via the set of multiple bundled PRBs of the symbol of the feedback opportunity.

Another apparatus for wireless communication at a first UE is described. The apparatus may include means for monitoring for a sidelink message from a second UE over a sidelink shared channel that is associated with a feedback opportunity, means for determining that the first UE is configured to transmit feedback for the sidelink message via a set of multiple bundled PRBs during a symbol of the feedback opportunity, and means for transmitting the feedback for the sidelink message to the second UE via the set of multiple bundled PRBs of the symbol of the feedback opportunity.

A non-transitory computer-readable medium storing code for wireless communication at a first UE is described. The code may include instructions executable by a processor to monitor for a sidelink message from a second UE over a sidelink shared channel that is associated with a feedback opportunity, determine that the first UE is configured to transmit feedback for the sidelink message via a set of multiple bundled PRBs during a symbol of the feedback opportunity, and transmit the feedback for the sidelink message to the second UE via the set of multiple bundled PRBs of the symbol of the feedback opportunity.

In some examples of the method, apparatuses, and non-transitory computer-readable medium described herein, transmitting the feedback for the sidelink message may include operations, features, means, or instructions for transmitting the feedback for the sidelink message to the second UE via one or more additional symbols of the feedback opportunity in accordance with a frequency hopping pattern, where the feedback may be transmitted during each of the one or more additional symbols via respective additional pluralities of bundled resource blocks.

In some examples of the method, apparatuses, and non-transitory computer-readable medium described herein, determining that the first UE may be configured to transmit feedback for the sidelink message via the set of multiple bundled PRBs may include operations, features, means, or instructions for identifying a quantity of PRBs to be bundled together in the set of multiple bundled PRBs and determining the set of multiple bundled PRBs based on the quantity, a starting PRB of the set of multiple bundled PRBs, and a direction in a frequency domain in which the set of multiple bundled PRBs extends from the starting PRB.

In some examples of the method, apparatuses, and non-transitory computer-readable medium described herein, identifying the quantity may include operations, features, means, or instructions for receiving, from the second UE, an indication of the quantity of the PRBs to be bundled together in the set of multiple bundled PRBs.

In some examples of the method, apparatuses, and non-transitory computer-readable medium described herein, determining that the first UE may be configured to transmit feedback for the sidelink message via the set of multiple bundled PRBs may include operations, features, means, or instructions for identifying a quantity of PRBs to be bundled together in the set of multiple bundled PRBs and determining the set of multiple bundled PRBs based on the quantity and a respective offset for each of the PRBs to be bundled together in the set of multiple bundled PRBs.

Some examples of the method, apparatuses, and non-transitory computer-readable medium described herein may further include operations, features, means, or instructions for receiving an indication of the respective offsets from the second UE.

Some examples of the method, apparatuses, and non-transitory computer-readable medium described herein may further include operations, features, means, or instructions for receiving, from a base station, an indication of a quantity of PRBs to be bundled together in the set of multiple bundled PRBs, where the quantity may be configured for a resource pool associated with the sidelink shared channel.

Some examples of the method, apparatuses, and non-transitory computer-readable medium described herein may further include operations, features, means, or instructions for receiving, from the second UE, an indication of a quantity of PRBs to be bundled together in the set of multiple bundled PRBs, where multiple quantities for the set of multiple bundled PRBs may be configured for a resource pool associated with the sidelink shared channel.

A method for wireless communication at a second UE is described. The method may include transmitting a sidelink message to a first UE over a sidelink shared channel that is associated with a feedback opportunity, determining that the first UE is configured to transmit feedback for the sidelink message via a set of multiple bundled PRBs during a symbol of the feedback opportunity, and receiving the feedback for the sidelink message from the first UE via the set of multiple bundled PRBs of the symbol of the feedback opportunity.

An apparatus for wireless communication at a second UE is described. The apparatus may include at least one processor, memory coupled (e.g., operatively, communicatively, functionally, electronically, or electrically) to the at least one processor. The memory may store instructions executable by the at least one processor to cause the apparatus to transmit a sidelink message to a first UE over a sidelink shared channel that is associated with a feedback opportunity, determine that the first UE is configured to transmit feedback for the sidelink message via a set of multiple bundled PRBs during a symbol of the feedback opportunity, and receive the feedback for the sidelink message from the first UE via the set of multiple bundled PRBs of the symbol of the feedback opportunity.

Another apparatus for wireless communication at a second UE is described. The apparatus may include means for transmitting a sidelink message to a first UE over a sidelink shared channel that is associated with a feedback opportunity, means for determining that the first UE is configured to transmit feedback for the sidelink message via a set of multiple bundled PRBs during a symbol of the feedback opportunity, and means for receiving the feedback for the sidelink message from the first UE via the set of multiple bundled PRBs of the symbol of the feedback opportunity.

A non-transitory computer-readable medium storing code for wireless communication at a second UE is described. The code may include instructions executable by a processor to transmit a sidelink message to a first UE over a sidelink shared channel that is associated with a feedback opportunity, determine that the first UE is configured to transmit feedback for the sidelink message via a set of multiple bundled PRBs during a symbol of the feedback opportunity, and receive the feedback for the sidelink message from the first UE via the set of multiple bundled PRBs of the symbol of the feedback opportunity.

In some examples of the method, apparatuses, and non-transitory computer-readable medium described herein, receiving the feedback for the sidelink message may include operations, features, means, or instructions for receiving the feedback for the sidelink message from the first UE via one or more additional symbols of the feedback opportunity in accordance with a frequency hopping pattern, where the feedback may be transmitted during each of the one or more additional symbols via respective additional pluralities of bundled resource blocks.

In some examples of the method, apparatuses, and non-transitory computer-readable medium described herein, determining that the first UE may be configured to transmit feedback for the sidelink message via the set of multiple bundled PRBs may include operations, features, means, or instructions for identifying a quantity of PRBs to be bundled together in the set of multiple bundled PRBs and determining the set of multiple bundled PRBs based on the quantity, a starting PRB of the set of multiple bundled PRBs, and a direction in a frequency domain in which the set of multiple bundled PRBs extends from the starting PRB.

In some examples of the method, apparatuses, and non-transitory computer-readable medium described herein, identifying the quantity may include operations, features, means, or instructions for transmitting, to the first UE, an indication of the quantity of the PRBs to be bundled together in the set of multiple bundled PRBs.

In some examples of the method, apparatuses, and non-transitory computer-readable medium described herein, determining that the first UE may be configured to transmit feedback for the sidelink message via the set of multiple bundled PRBs may include operations, features, means, or instructions for identifying a quantity of PRBs to be bundled together in the set of multiple bundled PRBs and determining the set of multiple bundled PRBs based on the quantity and a respective offset for each of the PRBs to be bundled together in the set of multiple bundled PRBs.

Some examples of the method, apparatuses, and non-transitory computer-readable medium described herein may further include operations, features, means, or instructions for transmitting an indication of the respective offsets to the first UE.

Some examples of the method, apparatuses, and non-transitory computer-readable medium described herein may further include operations, features, means, or instructions for receiving, from a base station, an indication of a quantity of PRBs to be bundled together in the set of multiple bundled PRBs, where the quantity may be configured for a resource pool associated with the sidelink shared channel.

Some examples of the method, apparatuses, and non-transitory computer-readable medium described herein may further include operations, features, means, or instructions for transmitting, to the first UE, an indication of a quantity of PRBs to be bundled together in the set of multiple bundled PRBs, where multiple quantities for the set of multiple bundled PRBs may be configured for a resource pool associated with the sidelink shared channel.

DETAILED DESCRIPTION

Figure 1:
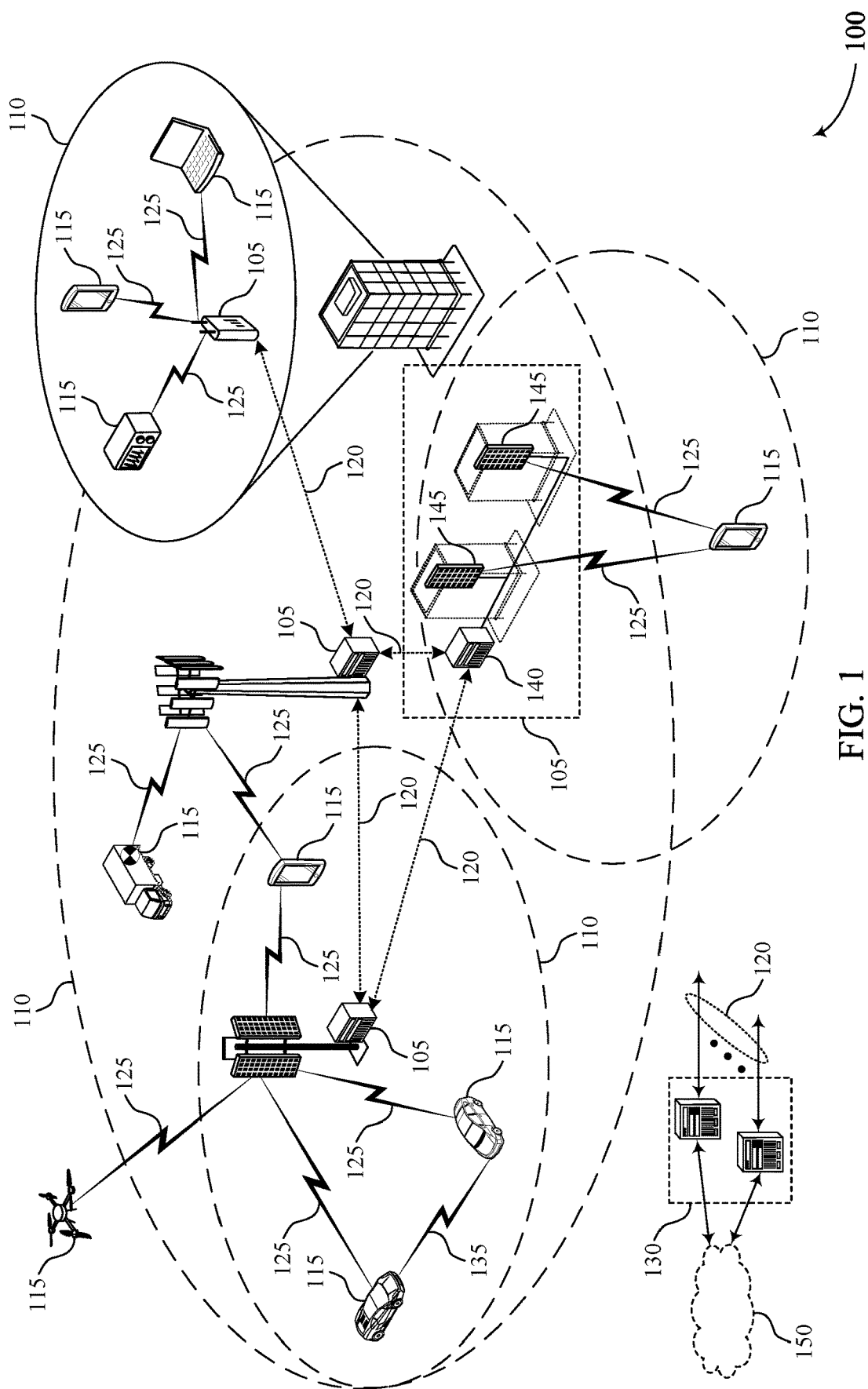
FIG. 1 illustrates an example of a wireless communications system that supports techniques for using multiple symbols to provide feedback for a sidelink transmission in accordance with aspects of the present disclosure.

A first user equipment (UE) and a second UE may communicate with each other via one or more sidelink transmissions (e.g., sidelink messages). A reliability of a sidelink feedback channel (e.g., physical sidelink feedback channel (PSFCH)) may support reliability for the sidelink transmissions between the first and second UEs. For example, the second UE may transmit, to the first UE, a sidelink message over a sidelink shared channel. The first UE may attempt to decode the sidelink message and may transmit feedback via a physical resource block (PRB) of a feedback opportunity (e.g. over the sidelink feedback channel), to indicate whether the first UE successfully decoded the sidelink message. The sidelink feedback channel may include multiple RBs for transmission of feedback via one symbol, which may collectively be referred to as the resources for the sidelink feedback channel. The resources for the sidelink feedback channel may be determined based on one or more parameters that are associated with resources used to transmit the sidelink message.

In some cases, if the reliability of the sidelink shared channel is low, the second UE may miss the feedback transmitted by the first UE. Accordingly, the second UE may repeat (e.g., unnecessarily repeat) a transmission of the sidelink message. In some cases, the second UE may fail to receive the feedback due to a collision with a transmission from another UE (e.g., via the same time and frequency resources, or similar time and frequency resources, as the feedback opportunity). A reliability of the sidelink feedback channel may be increased by adding more symbols to the sidelink feedback channel (e.g., to the feedback opportunity) and repeating the feedback via the multiple symbols. As described herein, the first and second UEs may determine a PRB to use for transmission of the feedback based on one or more parameters associated with the sidelink message.

In such cases, the first UE may use a same PRB (e.g., a PRB having a same index) across all symbols of the feedback opportunity (e.g., when the feedback opportunity has been expanded to multiple symbols). However, in some cases, a collision may occur between the feedback and another sidelink transmission from another UE (e.g., using same or similar resources). For example, collisions may occur between two UEs using same sidelink shared channel resources (e.g., because the UEs may determine to use the same PRB based on the techniques for determining a PRB). If collisions occur during one transmission instance of the feedback using the determined PRB, collisions may also occur for each transmission instance of the feedback (e.g., because the PRB index does not change), which may reduce a reliability of the sidelink feedback channel.

The present disclosure provides techniques for increasing a sidelink feedback channel reliability by performing frequency hopping (e.g., changing PRBs) from one symbol to another during the feedback opportunity, by transmitting the feedback using multiple PRBs within one symbol (e.g., performing PRB bundling), or both. In some cases, a pattern for frequency hopping or for PRB bundling (e.g., or parameters associated therewith) may be defined or determined by a base station, the first UE, the second UE, or any combination thereof. In some cases, a pattern for frequency hopping or for PRB bundling (e.g., or parameters associated therewith) may be defined or preconfigured (e.g., by a wireless communications standard).

The pattern for frequency hopping, for PRB bundling, or both, may be based on one or more parameters (e.g., an offset) associated with the first UE, the second UE, or both, such that the pattern may be different from other UEs (e.g., and decrease collisions in same or similar feedback resources). Based on applying the frequency hopping pattern, the PRB bundling, or both, the UEs may decrease a likelihood of collisions between the feedback and other transmissions, which may increase a reliability for transmission of the feedback via the sidelink feedback channel.

Aspects of the disclosure are initially described in the context of wireless communications systems. Aspects of the disclosure are further illustrated by and described with reference to resource patterns, process flows, apparatus diagrams, system diagrams, and flowcharts that relate to techniques for using multiple symbols to provide feedback for a sidelink transmission.

FIG. 1 illustrates an example of a wireless communications system 100 that supports techniques for using multiple symbols to provide feedback for a sidelink transmission in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may be a device such as a cellular phone, a smart phone, a personal digital assistant (PDA), a multimedia/entertainment device (e.g., a radio, a MP3 player, or a video device), a camera, a gaming device, a navigation/positioning device (e.g., GNSS (global navigation satellite system) devices based on, for example, GPS (global positioning system), Beidou, GLONASS, or Galileo, or a terrestrial-based device), a tablet computer, a laptop computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium.

In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In an aspect, techniques disclosed herein may be applicable to MTC or IoT UEs. MTC or IoT UEs may include MTC/enhanced MTC (eMTC, also referred to as CAT-M, Cat M1) UEs, NB-IoT (also referred to as CAT NB1) UEs, as well as other types of UEs. eMTC and NB-IoT may refer to future technologies that may evolve from or may be based on these technologies. For example, eMTC may include FeMTC (further eMTC), eFeMTC (enhanced further eMTC), and mMTC (massive MTC), and NB-IoT may include eNB-IoT (enhanced NB-IoT), and FeNB-IoT (further enhanced NB-IoT).

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC)

or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the medium access control (MAC) layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A second UE 115 may transmit a sidelink message to a first UE 115, and the first UE 115 may provide feedback for the sidelink message via an associated feedback opportunity. The first UE 115 may increase a reliability of the feedback by performing frequency hopping (e.g., changing PRBs) from one symbol to another during the feedback opportunity, by transmitting the feedback using multiple PRBs within one symbol of the feedback opportunity (e.g., performing PRB bundling), or both. The pattern for frequency hopping, for PRB bundling, or both, may be based on one or more parameters (e.g., an offset) associated with the first UE 115, the second UE 115, or both, such that the pattern may be different from other UEs 115 (e.g., and decrease collisions in same or similar feedback resources). Based on applying the frequency hopping pattern, the PRB bundling, or both, the UEs 115 may decrease a likelihood of collisions between the feedback and other transmissions, which may increase a reliability for transmission of the feedback via the feedback opportunity.

Figure 2:
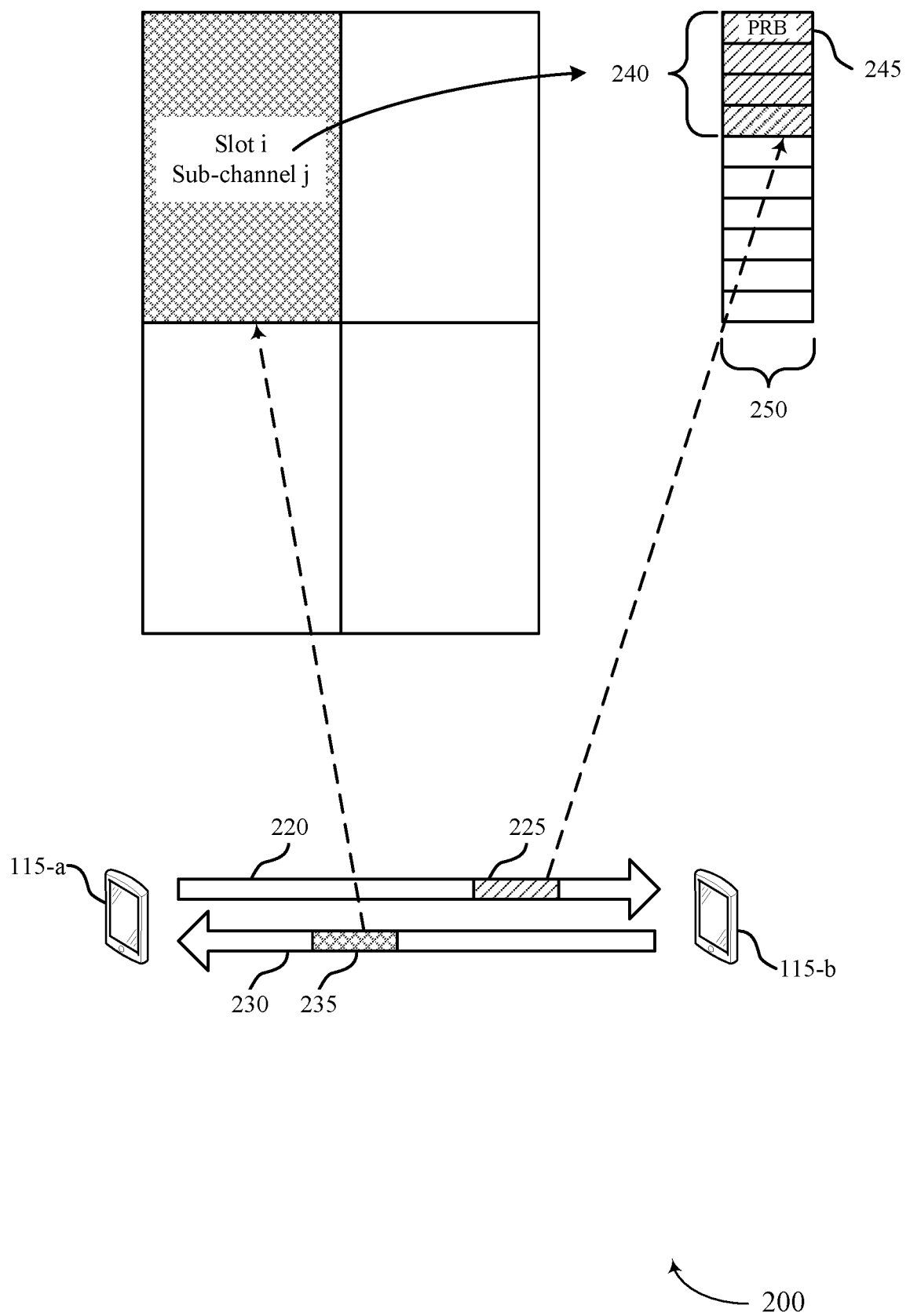
FIG. 2 illustrates an example of a wireless communications system that supports techniques for using multiple symbols to provide feedback for a sidelink transmission in accordance with aspects of the present disclosure.

FIG. 2 illustrates an example of a wireless communications system 200 that supports techniques for using multiple symbols to provide feedback for a sidelink transmission in accordance with aspects of the present disclosure. In some examples, wireless communications system 200 may implement or be implemented by aspects of wireless communication system 100. For example, wireless communications system 200 may include UEs 115-a and 115-b, which may be examples of UEs 115 described with reference to FIG. 1. UEs 115-a and UE 115-b may communicate with each other via one or more sidelink transmissions (e.g., sidelink messages).

A reliability of a sidelink feedback channel 220 (e.g., PSFCH) may support reliability for the sidelink transmissions between UEs 115-a and 115-b. For example, UE 115-b may transmit, to UE 115-a, a sidelink message 235 over a sidelink shared channel 230 (e.g., a physical sidelink shared channel (PSSCH)). UE 115-a may attempt to decode the sidelink message 235 and may transmit feedback 225 (e.g., HARQ feedback) via one PRB 245 of a feedback opportunity 240 (e.g. over the sidelink feedback channel 220) to indicate whether UE 115-a successfully decoded the sidelink message 235.

The sidelink feedback channel 220 may include multiple RBs 245 for transmission of feedback 225 via one symbol 250 (e.g., OFDM symbol), which may collectively be referred to as the resources for the sidelink feedback channel 220. The resources for the sidelink feedback channel 220 may be determined based on one or more parameters. For example, a parameter periodPSFCHresource may indicate a periodicity of the sidelink feedback channel 220 for a resource pool for UEs 115-a and 115-b, as a number of slots. The periodPSFCHresource may be set to a value from a list {0, 1, 2, 4}, where if the periodPSFCHresource is set to a value of 0, sidelink feedback channel transmissions from UEs 115 in the resource pool may be disabled. UE 115-a may transmit the feedback 225 over the sidelink feedback channel 220 in a first slot that includes sidelink feedback channel resources that is at least a number of slots (e.g., provided by MinTimeGapPSFCH, for the resource pool) after a last slot for reception of the sidelink shared channel 230.

A parameter rbSetPFSCH may indicate a set of PRBs 245 in the resource pool to be used for sidelink feedback channel transmissions, where the quantity of the set of PRBs 245 may be $M_{PRB,set}^{PSFCH}$. A quantity of PRBs 245 (e.g., $M_{subch,slot}^{PSFCH}$) for the sidelink feedback channel 220 feedback opportunity 240 (e.g., associated with a subchannel j and a slot i) may be based on the quantity of PRBs 245 (e.g., $M_{PRB,set}^{PSFCH}$) in the set, a number of subchannels $N_{subch}$ for the resource pool (e.g., as indicated by the parameter numSubchannel), and a number of slots $N_{PSSCH}^{PFSCH}$ of the sidelink shared channel 230 that are associated with a slot of the sidelink feedback channel 220 (e.g., as determined by periodPFSCHresource). For example, the quantity of PRBs 245 (e.g., $M_{subch,slot}^{PSFCH}$) for the sidelink feedback channel 220 feedback opportunity 240 may be determined by dividing $M_{PRB,set}^{PSFCH}$ by the product of $N_{subch}$ and $N_{PSSCH}^{PFSCH}$ (e.g., $M_{PRB,set}^{PSFCH}/[N_{subch}*N_{PSSCH}^{PSFCH}]$).

In one example, $N_{PSSCH}^{PSFCH}$ (e.g., a periodicity of the sidelink feedback channel 220) may be equal to 4. N subch (e.g., a number of sub-channels per resource pool) may be equal to 10, and $M_{PRB,set}^{PSFCH}$ (e.g., a number of PRBs 245 for the sidelink feedback channel 220) may be equal to 80. In this example, the number of PRBs 245 within a feedback opportunity 240 (e.g., $M_{subch,slot}^{PSFCH}$, a number of PRBs 245 associated with a given slot and sub-channel) may be 2. In such cases, each sub-channel may be associated with a feedback opportunity 240 having two PRBs 245, where feedback 225 may be sent via one of the two PRBs 245.

The feedback opportunity 240 of the sidelink feedback channel 220 (e.g., the PRBs 245 included in the feedback opportunity 240, from the set of PRBs 245) may be mapped to one or more resources of the sidelink shared channel 230 used for transmission of the sidelink message 235. For example, the mapping to the feedback opportunity 240 may be based on a starting sub-channel j of the sidelink shared channel 230 used for the sidelink message 235 (e.g., if a sidelink communication parameter sl-PSFCH-CandidateResource Type is configured as startSubCH), or a number of sub-channels of the sidelink shared channel 230 used for the sidelink message 235 (e.g., if a sidelink communication parameter sl-PSFCH-CandidateResourceType is configured as allocSubCH).

The mapping may further be based on a slot i of the sidelink shared channel 230 used for transmission of the sidelink message 235, as well as an identifier (ID) of a source UE 115 (e.g., UE 115-b) and an ID of a destination UE 115 (e.g., UE 115-a) for the sidelink message 235. When mapping between the sidelink shared channel 230 and the feedback opportunity 240 of the sidelink feedback channel 220, a number of available resources on the sidelink feedback channel 220 may be greater than or equal to a number of UEs 115 in an option 2 for groupcast transmissions.

For example, UEs 115-a and 115-b may determine the feedback opportunity 240 associated with the sidelink message 235 using an equation similar to Equation (1):

$$PRBs = (i+j*N_{PSSCH}^{PSFCH})*M_{subch,slot}^{PSFCH}, (i+1+j*N_{PSSCH}^{PSFCH})*M_{subch,slot}^{PSFCH}-1 \quad (1)$$

where PRBs represents the PRBs 245 allocated to the feedback opportunity (e.g., from $M_{PRB,set}^{PSFCH}$), $N_{PSSCH}^{PSFCH}$ represents a number of slots of the sidelink shared channel 230 that are associated with a slot of the sidelink feedback channel 220 (e.g., as determined by the periodicity of the sidelink feedback channel 220), i represents an index of the slot associated with transmission of the sidelink message 235 (e.g., where $0 \leq i \leq N_{PSSCH}^{PSFCH}$), j represents an index of the sub-channel associated with transmission of the sidelink message 235 (e.g., where $0 \leq j \leq N_{subch}$), and $M_{subch,slot}^{PSFCH}$ represents a number of PRBs 245 for the sidelink feedback channel 220 associated with a given sub-channel and slot.

In some cases, if the reliability of the sidelink feedback channel 220 is low, UE 115-b may miss the feedback 225 transmitted by UE 115-a. Accordingly, UE 115-b may repeat (e.g., unnecessarily repeat) a transmission of the sidelink message 235 (e.g., may retransmit the sidelink message 235), for example, because UE 115-b may be unable to determine that the sidelink message 235 was successfully received and decoded by UE 115-a. In some cases, UE 115-b may fail to receive the feedback 225 due to a collision with a transmission from another UE 115 (e.g., via the same time and frequency resources, or similar time and frequency resources, as the feedback opportunity 240).

The sidelink feedback channel 220 may have a two-symbol duration, where one symbol 250 may be used for automatic gain calibration (AGC) training, and the other symbol 250 may be used to transmit feedback (e.g., HARQ feedback). With the expansion of sidelink use cases (e.g., V2X and non-V2X use cases), such as industrial internet of things (IIoT) consumer use cases (e.g., smart wearables), a sidelink feedback channel 220 may be configured to support lower latency and higher reliability communications. Reliability of sidelink communications may be further improved by deriving channel state information (CSI) from a sidelink shared channel 230 (e.g., PSSCH) and transmitting the CSI on the sidelink feedback channel 220. Accordingly, the sidelink feedback channel 220 may be configured to increase a reliability of the feedback 225 and to support transmission of CSI (e.g., channel quality indicator (CQI), rank indication (RI), power commands) via the sidelink feedback channel 220.

For example, reliability of a sidelink feedback channel 220 may be increased by adding more symbols 250 to the sidelink feedback channel 220 (e.g., to the feedback opportunity 240) and repeating the feedback 225 via the multiple symbols 250. Repeating the feedback 225 via multiple symbols 250 may increase or maintain a quality of service (QoS) requirement for applications such as URLLC and IIoT, which may be associated with a diverse set of latency and reliability metrics. As described herein, UEs 115-a and 115-b may determine a PRB 245 to use for transmission of the feedback 225 based on the slot and sub-channel for the transmission of the sidelink message 235 over the sidelink shared channel 230, as well as (e.g., in some cases) the source ID and the destination ID associated with the sidelink message 235 (e.g., an ID for a source UE 115 and an ID for a destination UE 115).

Based on these parameters, UE 115-a may use a same PRB 245 (e.g., a PRB having a same index) across all symbols 250 (e.g., OFDM symbols) of the feedback opportunity 240. However, in some cases, a collision may occur between the feedback 225 and another sidelink transmission from another UE 115 (e.g., using same or similar resources). For example, collisions may occur between two UEs 115 using same sidelink shared channel resources (e.g., because the UEs 115 may determine to use the same PRB 245 based on the techniques for determining a PRB 245). If collisions occur during one transmission instance of the feedback 225 using the determined PRB 245, collisions may also occur for each transmission instance of the feedback 225 (e.g., because the PRB index does not change), which may reduce a reliability of the sidelink feedback channel 220.

The present disclosure provides techniques for increasing a sidelink feedback channel reliability by performing frequency hopping (e.g., changing PRBs 245) from one symbol 250 to another during the feedback opportunity 240, by transmitting the feedback using multiple PRBs 245 within one symbol 250 (e.g., performing PRB bundling), or both. A pattern for frequency hopping or for PRB bundling may be globally defined across resource pools or configured per resource pool by a base station 105 (e.g., a base station 105 as described with reference to FIG. 1). For example, a base station may define multiple hopping patterns in time, frequency, or any combination thereof, and may define a pattern to be used across all resource pools or to be used for one resource pool. In some cases, a pattern for frequency hopping or for PRB bundling (e.g., or parameters associated therewith) may be defined or determined by UE 115-a, UE 115-b, or both. In some cases, a pattern for frequency hopping or for PRB bundling (e.g., or parameters associated therewith) may be defined or preconfigured for UEs 115-a and 115-b (e.g., by a wireless communications standard).

The pattern for frequency hopping, for PRB bundling, or both may be based on one or more parameters (e.g., an offset) associated with UE 115-a, UE 115-b, or both, such that the pattern may be different from UE 115 to UE 115 (e.g., and decrease collisions in same or similar feedback resources). In some cases, the frequency hopping pattern may be two dimensional and may be based on the source ID and destination ID of the sidelink message 235, along with one or more preconfigured parameters. For example, the pattern may be defined in a first dimension m based on a source ID, a destination ID, and a number (e.g., R) of available PRBs (e.g., m=mod(source ID+destination ID,R)), which may represent a legacy method for determining a PRB 245 for transmission of the feedback 225. The pattern may also be defined in a second dimension n based on a source ID, a destination ID, and one or more parameters P (e.g., n=mod(source ID+destination ID+P)). In some cases, P may include or represent a number of symbols 250 in the feedback opportunity 240 of the sidelink feedback channel 220. The combination of m and n (e.g., (m,n)) may map to a frequency hopping pattern.

Based on applying the frequency hopping pattern, the PRB bundling, or both, UEs 115-a and 115-b may decrease a likelihood of collisions between the feedback 225 and other transmissions, which may increase a reliability for transmission of the feedback 225 via the sidelink feedback channel 220.

Figure 3A:
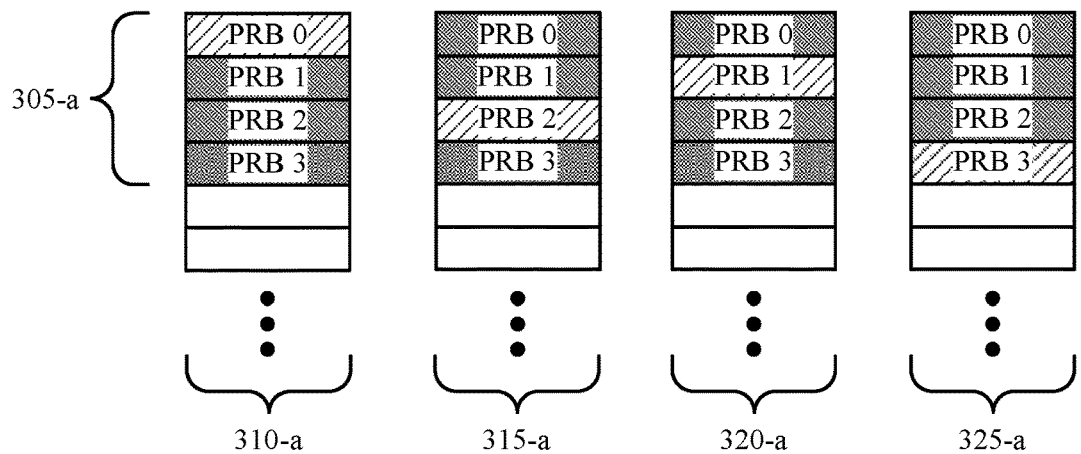
FIGS. 3A through 3C illustrate examples of resource patterns that support techniques for using multiple symbols to provide feedback for a sidelink transmission in accordance with aspects of the present disclosure.
Figure 3B:
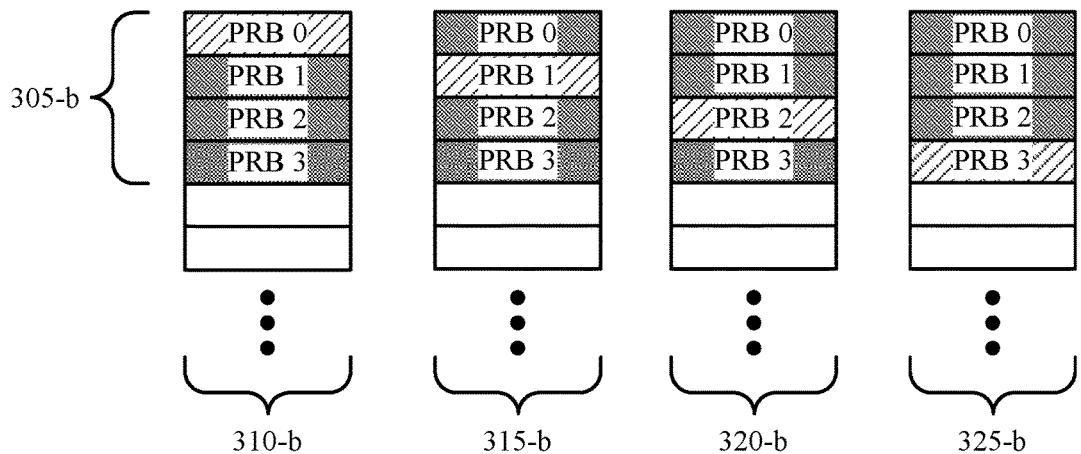
Figure 3C:
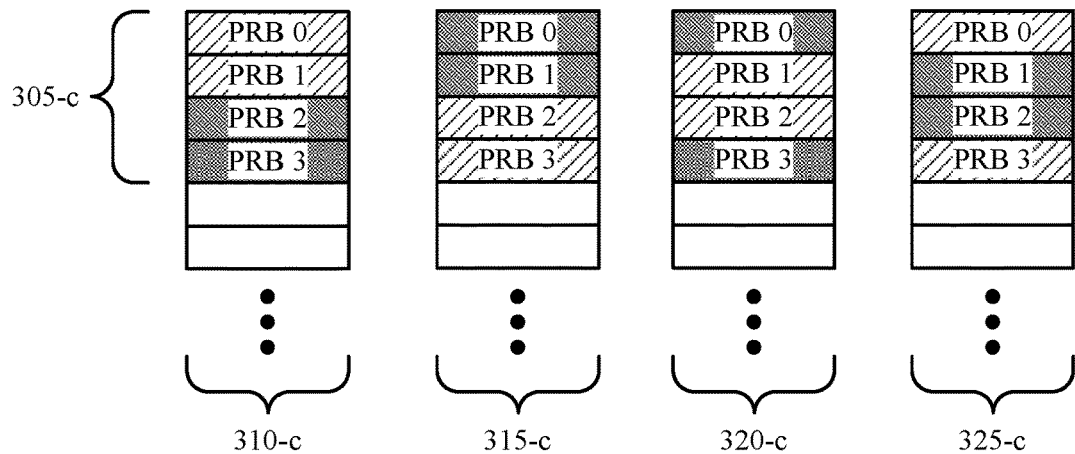

FIGS. 3A through 3C illustrate examples of resource patterns 301, 302, and 303 that support techniques for using multiple symbols to provide feedback for a sidelink transmission in accordance with aspects of the present disclosure. In some examples, the resource patterns 301, 302, and/or 303 may be implemented by aspects of wireless communications system 100 or 200. For example, the resource pattern 301, 302, and/or 303 may be implemented by a first UE 115 and a second UE 115, which may respectively be examples of UEs 115 described with reference to FIGS. 1 and 2. As described with reference to FIG. 2, the resource pattern 301, 302, and/or 303 may be associated with a frequency hopping pattern, a PRB bundling pattern, or both, which may be implemented by the first UE 115 to transmit feedback (e.g., HARQ feedback) to the second UE 115 (e.g., feedback for a sidelink message transmitted by the second UE 115). The feedback may be transmitted on a sidelink feedback channel (e.g., PSFCH) having a feedback opportunity 305 that includes two or more symbols.

As described herein, frequency hopping may include changing a PRB (e.g., and associated PRB index) used to transmit the feedback in each symbol (e.g., OFDM symbol) of the feedback opportunity 305 (e.g., in symbols 310, 315, 320, and 325), such that the resources used for transmission of the feedback change from one frequency to another. For example, for a feedback opportunity 305-a, the first UE 115 may transmit feedback in a PRB '0' (e.g., at a first frequency) during symbol 310-a, in a PRB '2' (e.g., at a second frequency) during symbol 315-a, in a PRB '1' during symbol 320-a, and in a PRB '3' during symbol 325-a. For a feedback opportunity 305-b, the first UE 115 may transmit feedback in a PRB '0' (e.g., at a first frequency) during symbol 310-b, in a PRB '1' (e.g., at a second frequency) during symbol 315-b, in a PRB '2' during symbol 320-b, and in a PRB '3' during symbol 325-b.

Accordingly, each symbol (e.g., symbols 310, 315, 320, 325) of the feedback opportunity 305 may be associated with a respective PRB and a PRB index (e.g., different PRBs and different PRB indices for different symbols). The PRB indices (e.g., as indicated by respective PRB offsets) used by the first UE 115, in the respective symbols, may be based on an offset (e.g., an initial offset) for the first UE 115. The offset may determine a starting PRB (e.g., PRB index) for symbol 310, and the frequency hopping pattern may be followed for the other symbols (e.g., symbols 315, 320, and 325), based on the starting PRB index.

In one example, the frequency hopping pattern illustrated by FIG. 3A (e.g., the resource pattern 301) may be determined by a bit-reversal permutation algorithm. For example, a respective PRB index (e.g., PRB offset) may be selected from N PRBs in the feedback opportunity 305-*a* (e.g., four PRBs), where $N=2^k$ and k is a number of bits used to represent N (e.g., where N is a power of two). In such cases, the PRB indices for each symbol may be chosen according to a bit reversal permutation. The bit reversal permutation may include indexing elements of a sequence of numbers (e.g., binary representations of numbers) from 0 to N−1. For example, where N=4 (e.g., a number of PRBs in the feedback opportunity 305-*a* is four) and k=2 (e.g., a number of bits is two), the sequence of numbers may be '00' (e.g., 0), '01' (e.g., 1), '10' (e.g., 2), and '11' (e.g., 3).

The frequency hopping pattern may be defined by reversing the binary representations of each of the numbers, which binary representations may each be padded (e.g., with one or more leading '0' values) such that each of the binary numbers has a length equal to k. For example, the new sequence of numbers for k=2 and N=4 may be '00' (e.g., 0), '10' (e.g., 2), '01' (e.g., 1), and '11' (e.g., 3). Similarly, the bit reversal permutation may result in different sequences of numbers for different values of N and k. For example, where k=3 and N=8, the sequence (e.g., non-binary number sequence) resulting from the bit reversal permutation may be 0, 4, 2, 6, 1, 5, 3, and 7. Where k=4 and N=16, the sequence (e.g., non-binary number sequence) resulting from the bit reversal permutation may be 0, 8, 4, 12, 2, 10, 6, 14, 1, 9, 5, 13, 3, 11, 7, and 15.

Each symbol may be mapped to a PRB index given by the reversed value in the new sequence of numbers. For example, for the feedback opportunity 305-*a*, N=4 and k=2. The bit-reversal permutation may therefore result in a sequence of numbers 0, 2, 1, 3. Each UE 115 (e.g., the first UE 115, the second UE 115, one or more other UEs 115) may have a respective offset (e.g., initial offset) to PRB selection based on the bit-reversal permutation, where the initial offset may be defined by one or more parameters that may be defined or preconfigured, may be selected by the first UE 115, or may be indicated by higher layer signaling (e.g., radio resource control (RRC) signaling, a MAC control element (MAC-CE)).

Accordingly, a PRB index (e.g., a PRB offset i) for a respective symbol may be defined by an equation similar to Equation (2):

$$i=(\text{source ID}+\text{destination ID}+h+g)\bmod(R) \quad (2)$$

where i may represent a PRB index (e.g., PRB offset) for the respective symbol, source ID may represent an ID of the UE 115 transmitting the sidelink message (e.g., the second UE 115), destination ID may represent an ID of the UE 115 receiving the sidelink message (e.g., the first UE 115), h may represent the initial offset for the respective UE 115 (e.g., for the first UE 115), g may represent the offset from a pattern for the respective symbol (e.g., may represent the number given by the bit reversal permutation for the respective symbol), mod may represent a modulo operation, and R may represent a number of PRBs in the feedback opportunity 305-*a* (e.g., in the PSFCH resource). The first UE 115 may use the initial offset to determine the PRB for transmitting the feedback, for example, after defining or determining the feedback resources (e.g., the feedback opportunity 305-*a*) allocated to the first UE 115.

Thus, for an initial offset of '0' (e.g., if the first UE 115 is configured with an initial offset of '0'), the bit reversal permutation algorithm (e.g., as implemented using Equation (2)) may result in a sequence of numbers 0, 2, 1, 3. As such, PRB '0' (e.g., PRB index 0) may be used in symbol 310-*a*, PRB '2' (e.g., PRB index 2) may be used in symbol 315-*a*, PRB '1' (e.g., PRB index 1) may be used in symbol 320-*a*, and PRB '3' (e.g., PRB index 3) may be used in symbol 325-*a*. Similarly, if a UE 115 has an initial offset of '1,' the bit reversal permutation algorithm may result in a sequence of numbers 1, 3, 2, 0, and the UE 115 may use the corresponding PRB indices sequentially in the symbols of the feedback opportunity 305-*a*. If a UE 115 has an initial offset of '2,' the bit reversal permutation algorithm may result in a sequence of numbers 2, 0, 3, 1, and the UE 115 may use the corresponding PRB indices sequentially in the symbols of the feedback opportunity 305-*a*. PRB indices may similarly be determined using an initial offset of '3,' which may result in a sequence of numbers 3, 1, 0, 2.

In an example illustrated by FIG. 3B (e.g., resource pattern 302), a frequency hopping pattern for a feedback opportunity 305-*b* may be determined by a staircase algorithm, where the PRB index (e.g., PRB offset) for each symbol (e.g., symbols 310, 315, 320, and 325) may increase or increment by one PRB index for each consecutive symbol. For example, the first UE 115 may start from an initial PRB (e.g., determined by the initial offset), and increase the PRB index (e.g., change frequency) for each consecutive symbol. When a highest PRB index (e.g., final PRB) is reached (e.g., PRB '3'), the first UE 115 may move to a lowest PRB index (e.g., first PRB, PRB '0') in a next symbol. While the examples described herein are associated with four PRBs in the feedback opportunity 305-*b*, it is to be understood that the same examples may apply to any number of PRBs in the feedback opportunity 305-*b* (e.g., any number of two or more PRBs).

For example, if the first UE 115 has an initial offset of '0,' the first UE 115 may use PRB '0' for transmission of the feedback during symbol 310-*b*, PRB '1' during symbol 315-*b*, PRB '2' during symbol 320-*b*, and PRB '3' during symbol 325-*b*. If the first UE 115 has an initial offset other than '0' (e.g., an initial offset of '1,' '2,' '3'), the first UE 115 may use a PRB index indicated by the initial offset during symbol 310-*b*, and may increment the PRB index as described herein for the following symbols (e.g., symbols 315-*b*, 320-*b*, and 320-*c*). In such cases, when a highest PRB index is reached, a next PRB index (e.g., PRB offset) may wrap from the highest PRB index (e.g., PRB '3'') to a lowest PRB index (e.g., PRB '0') in the next symbol. The staircase algorithm may represent an algorithm that is computationally simple, and predetermined, in comparison with the bit reversal permutation method described with reference to FIG. 3A. However, in some cases (e.g., when consecutive PRBs are in deep fading) the bit reversal permutation method may result in less errors.

A frequency hopping design based on the staircase method or the bit reversal permutation method may decrease a likelihood of collisions between UEs transmitting feedback on a sidelink feedback channel (e.g., PSFCH) because a UE 115 may not use a same PRB in each symbol, thereby decreasing a likelihood of collisions and increasing an overall reliability of the system.

In some cases, a base station (e.g., base station 105 as described with reference to FIG. 1) may configure UEs 115 (e.g., the first UE 115, the second UE 115, one or more other UEs 115) to use either the staircase method (e.g., algorithm) or the bit reversal permutation method (e.g., algorithm) per resource pool. For example, the base station 105 may indicate a method (e.g., bit reversal permutation method or staircase method, among other methods) to be used for a respective resource pool associated with a sidelink shared channel for the sidelink message. Additionally or alternatively, the base station 105 may indicate one or more parameters associated with the method. The method used in each resource pool may, for example, be a function of channel selectivity (e.g., whether the channel is highly selective and changes quickly in frequency). In some cases, the use of a certain method may be configured using higher layer signaling (e.g., sidelink (PC5) RRC signaling, MAC-CE), where the method may be used for all resource pools. Additionally or alternatively, signaling may indicate one or more parameters associated with the method. In some cases, the method or algorithm to be used by be defined or preconfigured (e.g., by a wireless communications standard).

In some cases, the first UE 115 or the second UE 115 may receive an indication of an algorithm (e.g., bit reversal permutation algorithm or staircase algorithm) to use to determine the frequency hopping pattern. In some cases, the indication may be based on a resource pool associated with the sidelink shared channel (e.g., PSSCH), and in some cases the indication may be the same for all feedback (e.g., PSFCH) communications within a sidelink resource pool.

In some cases, the first UE 115 (e.g., a receiving UE 115, a UE 115 receiving the sidelink message) may select an initial offset h based on a source ID, destination ID, and a number of PRBs of the feedback opportunity (e.g., h=(source ID+destination ID)mod(R)). After selecting the initial offset, and based on the sequence of numbers (e.g., a deterministic set) derived from the bit reversal permutation or the staircase algorithm, the first UE 115 may implement the frequency hopping pattern (e.g., selecting a PRB for each symbol using the offset from the pattern for the given symbol, as given by Equation (2) or by the staircase method). In some cases, the first UE 115 may signal a preferred or recommended initial offset to a transmitting UE (e.g., using RRC signaling or using a MAC-CE, using dedicated signaling for feedback such as a PSFCH or a PSSCH).

In some cases, the initial offset may be specific to the second UE 115 (e.g., a transmitting UE 115, transmitting the sidelink message) and the second UE 115 may indicate the initial offset to the first UE 115 (e.g., a receiving UE 115), where each UE in the system may have a different offset. The second UE 115, for example, may set the initial offset for the first UE 115 using sidelink control information (SCI) (e.g., SCI-2), using RRC signaling, or using a MAC-CE, and other transmitting UEs may choose other offsets if they overhear the signaling (e.g., receive the SCI signaling). For example, other transmitting UEs 115 may receive (e.g., overhear) an SCI transmitted from the second UE 115 to the first UE 115 and may select a different initial offset than the initial offset indicated in the SCI transmitted by the second UE 115.

For example, an initial offset for the first UE 115 may be '0' and the UE may use PRBs '0,' '2,' '1,' and '3' with the bit reversal permutation, while an initial offset for a third UE may be '1' and the UE may use PRBs '1,' '3,' '2,' and '0.' Other offsets may also be used by other UEs 115. Therefore, each UE 115 may use a different PRB at each symbol, based on the associated algorithm and the offset corresponding to the UE 115, which may decrease a likelihood of collisions between transmissions on the sidelink feedback channel (e.g., PSFCH), thereby increasing reliability and decreasing a number of unnecessary retransmissions.

FIG. 3C illustrates an example of a PRB bundling pattern as described with reference to FIG. 2. In some examples, a frequency hopping pattern may be implemented in conjunction with PRB bundling, as illustrated by FIG. 3C. In the example of the PRB bundling pattern illustrated by FIG. 3C, the first UE 115 may use two or more PRBs per symbol (e.g., may use PRB '0' and PRB '1' in symbol 310-c, and so forth), which may be referred to as bundled PRBs, to transmit the feedback for the sidelink message. For example, the first UE 115 may identify a quantity of PRBs to be bundled together from a set of PRBs (e.g., from PRBs in feedback opportunity 305-c), and may bundle, in each symbol of the feedback opportunity 305-c, that quantity of PRBs. For example, if the first UE 115 is configured to use X PRBs per symbol of the feedback opportunity 305-c (e.g., for transmission of the feedback), the first UE 115 may use X consecutive PRBs (e.g., bundle X consecutive PRBs) in each symbol of the feedback opportunity 305-c for transmission of the feedback. For example, PRB '0' and PRB '1' may be bundled in symbol 310-c, PRB '2' and PRB '3' may be bundled in symbol 315-c, and so forth.

In a first example, PRBs may be selected and bundled based on the quantity of PRBs, a starting PRB, and a direction in a frequency domain in which the bundled PRBs extend from the starting PRB. For example, the first UE 115 may be configured (e.g., via signaling from a base station 105 or the second UE 115) with the quantity, the starting PRB, and the direction. Additionally or alternatively, the quantity, the starting PRB, and the direction may be defined or preconfigured for the first UE 115 (e.g., by a wireless communications standard). In the example of symbol 310-c, the first UE 115 may use a starting PRB of '0,' a direction of increasing PRB indices, and a quantity of 2 PRBs. Alternatively, in the example of symbol 310-c, the first UE 115 may use a starting PRB of '1,' a direction of decreasing PRB indices, and a quantity of 2 PRBs.

In a second example, the first UE 115 may use two or more consecutive offsets (e.g., PRB offsets or PRB indices as described with reference to FIGS. 3A and 3B), which may be determined using the source ID, destination ID, and mod(R). In some cases, the consecutive offsets may be determined based on an indication from the second UE 115 (e.g., as described with reference to FIGS. 3A and 3B). For example, the first UE 115 may determine two consecutive PRB offsets (e.g., PRB indices) for symbol 310-c, '0' and '1,' which may be determined in conjunction with either the bit reversal permutation method or the staircase method. As such, if the first UE 115 determines PRB offsets '0' and '1,' the first UE 115 may bundle, in symbol 310-c, PRB '0' (e.g., according to the PRB offset 0) and PRB '1' (e.g., according to the offset 1). In one example, if the first UE 115 is using the bit reversal permutation method, the first UE 115 may use PRBs '2' and '3' in symbol 315-c, PRBs '1' and '2' in symbol 320-c, and PRBs '3' and '0' in symbol 325-c.

In some cases, the number of bundled PRBs per symbol (e.g., X) may be configured per resource pool, such as by a base station 105 (e.g., the base station may indicate X to the first UE 115, the second UE 115, or both). In some cases, the base station 105 may configure multiple values of X for a resource pool associated with the sidelink feedback channel or sidelink shared channel, and the second UE 115 (e.g., transmitting UE 115) may select one of the values. The second UE 115 may configure the first UE 115 (e.g., via SCI, RRC signaling, a MAC-CE) with the selected number X, for example, before communicating the sidelink message (e.g., while establishing a connection with the first UE 115).

In some cases, the number of bundled PRBs per symbol (e.g., X) may be selected by the second UE 115 (e.g., independent of a resource pool configuration or an indication by a base station 105) and indicated to the first UE 115. Similarly, the second UE 115 may select multiple PRB offsets per symbol and may signal an indication of these offsets to the first UE 115.

By using multiple PRBs per symbol for transmission of the feedback via the sidelink feedback channel, reliability of the sidelink feedback channel may be increased. For example, based on using multiple frequencies for the feedback transmission, a frequency diversity may increase, which may increase reliability and decrease chances of a collision with each PRB used for the transmission.

Figure 4:
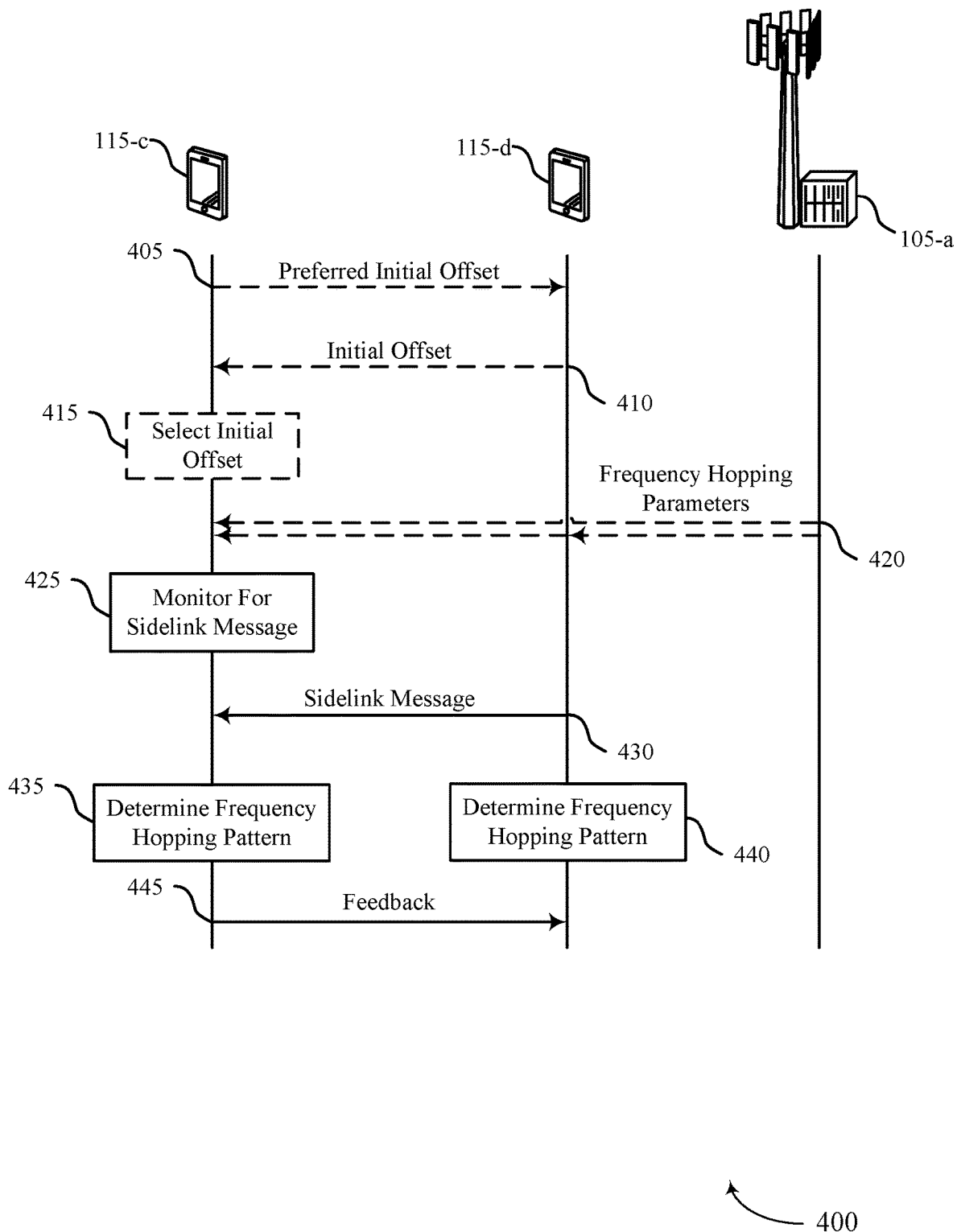
FIG. 4 illustrates an example of a process flow that supports techniques for using multiple symbols to provide feedback for a sidelink transmission in accordance with aspects of the present disclosure.

FIG. 4 illustrates an example of a process flow 400 that supports techniques for using multiple symbols to provide feedback for a sidelink transmission in accordance with aspects of the present disclosure. In some examples, process flow 400 may be implemented by aspects of wireless communication system 100 or 200, as well as aspects of resource pattern 301 or 302. For example, process flow 400 may be implemented by a base station 105-*a*, UE 115-*c*, and UE 115-*d*, which may be examples of a base station 105 and UEs 115 as described with reference to FIGS. 1, 2, and 3A through 3C.

In the following description of the process flow 400, the operations between UE 115-*c*, UE 115-*d*, and base station 105-*a* may be transmitted or performed in a different order than the order shown. Some operations may also be left out of the process flow 400, or other operations may be added to the process flow 400. It is to be understood that while UE 115-*c*, UE 115-*d*, and base station 105-*a* are shown performing the operations of process flow 400, any wireless device may perform the operations shown.

In some cases, at 405, UE 115-*c* may transmit an indication of a preferred initial offset UE 115-*d*, where the initial offset may be an example of an initial offset as described with reference to FIGS. 3A and 3B.

In some cases, at 410, UE 115-*d* may transmit, to UE 115-*c*, an indication of an initial offset for UE 115-*c* to use in accordance with a frequency hopping pattern, as described with reference to FIGS. 3A and 3B. In some cases, the indication of the initial offset may be based on the preferred initial offset indicated by UE 115-*c*. In some cases, the initial offset may be specific to UE 115-*d*.

In some cases, at 415, UE 115-*c* may select an initial offset to use in accordance with a frequency hopping pattern, as described with reference to FIGS. 3A and 3B. In some cases, based on selecting the initial offset, UE 115-*c* may transmit an indication of the selected initial offset to UE 115-*d*.

In some cases, at 420, base station 105-*a* may transmit an indication of one or more parameters associated with a frequency hopping pattern to UE 115-*c*, UE 115-*d*, or both. Additionally or alternatively, UE 115-*d* may transmit an indication of the one or more parameters associated with the frequency hopping pattern to UE 115-*c*. The parameter(s) may indicate a specific frequency hopping pattern (e.g., as described with reference to FIGS. 3A and 3B) or may indicate one or more parameters to be used in determining the frequency hopping pattern at UE 115-*c*, UE 115-*d*, or both. In some cases, the parameter(s) may be specific to a resource pool associated with a sidelink shared channel used by UEs 115-*c* and 115-*d*, or may be used for all sidelink resource pools.

At 425, UE 115-*c* may monitor for a sidelink message from UE 115-*d* over the sidelink shared channel. For example, UEs 115-*c* and 115-*d* may communicate with each other via one or more sidelink communications, where UE 115-*d* may be a transmitting device and UE 115-*c* may be a receiving device for at least the sidelink message. As described with reference to FIG. 2, the sidelink shared channel may be associated with a feedback opportunity (e.g., on a sidelink feedback channel or PSFCH) which may include multiple symbols. In some cases, monitoring for the sidelink message may include receiving the sidelink message. For example, techniques performed by UE 115-*c* in monitoring for the sidelink message may result in, or may include, receiving the sidelink message.

At 430, UE 115-*d* may transmit the sidelink message to UE 115-*c* over the sidelink shared channel. For example, UE 115-*d* may transmit the sidelink message using time and frequency resources (e.g., a slot and a sub-channel) as described herein with reference to FIG. 2.

At 435, UE 115-*c* may determine a frequency hopping pattern for transmission of feedback for the sidelink message via the multiple symbols of the feedback opportunity (e.g., based on one or more parameters as described herein). Similarly, at 440, UE 115-*d* may determine a frequency hopping pattern for reception of the feedback for the sidelink message via the multiple symbols of the feedback opportunity (e.g., based on one or more parameters as described herein).

The frequency hopping pattern may be associated with multiple PRBs (e.g., as described with reference to FIGS. 3A and 3B), where each PRB may be associated with a respective symbol (e.g., of the multiple symbols of the feedback opportunity) and a PRB index. The PRB index may be based on a PRB offset for the respective symbol, as described with reference to FIGS. 3A and 3B. In some cases, the PRB indices may also be based on the initial offset, which may apply to each of the symbols. In some cases, the frequency hopping pattern may be based on an algorithm, such as the staircase algorithm as described with reference to FIG. 3B or the bit-reversal algorithm as described with reference to FIG. 3A.

At 445, UE 115-*c* may transmit the feedback for the sidelink message to UE 115-*d* via the multiple symbols of the feedback opportunity (e.g., to indicate if the sidelink message was successfully decoded). For example, the feedback may be transmitted in accordance with the determined frequency hopping pattern.

Figure 5:
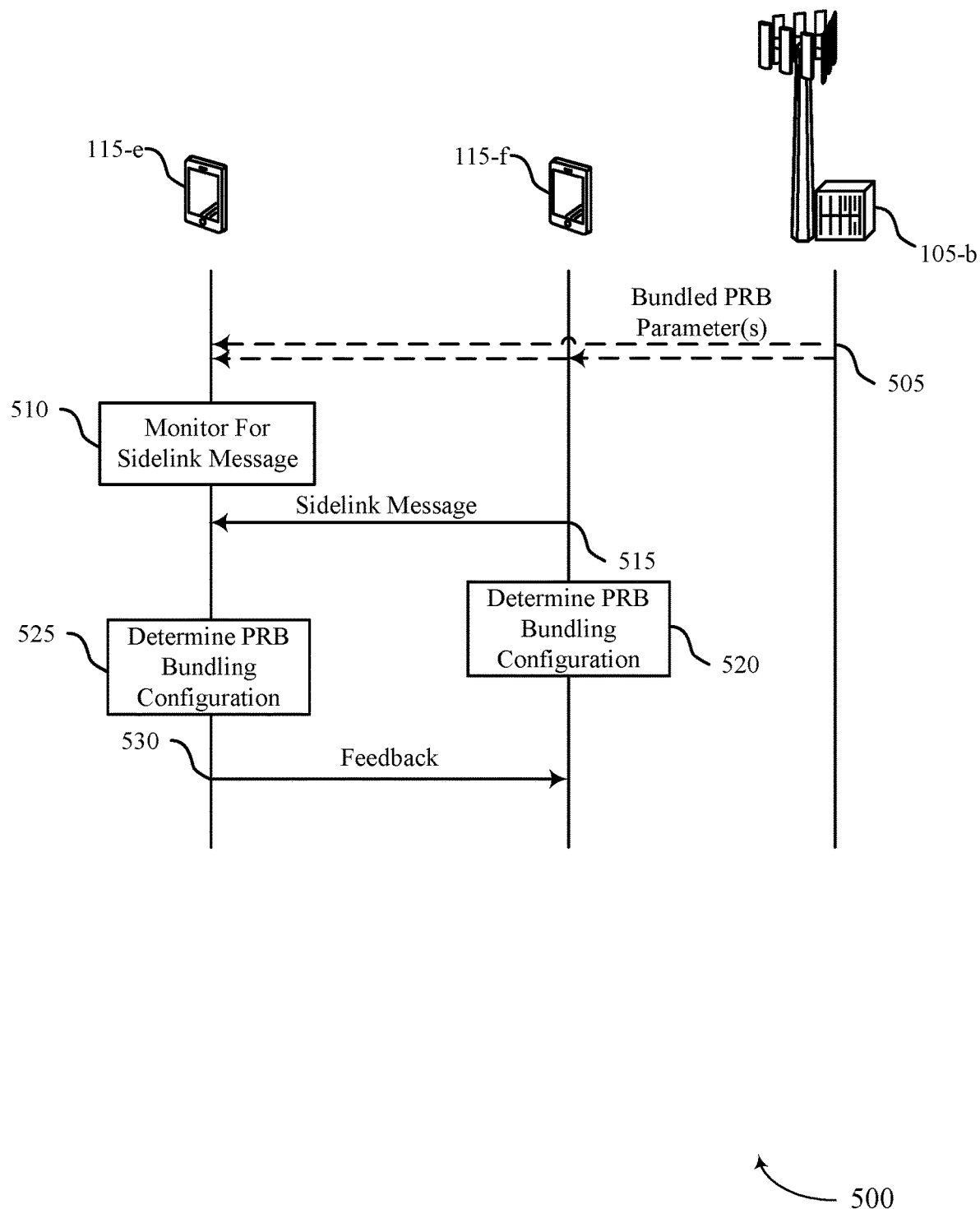
FIG. 5 illustrates an example of a process flow that supports techniques for using multiple symbols to provide feedback for a sidelink transmission in accordance with aspects of the present disclosure.

FIG. 5 illustrates an example of a process flow 500 that supports techniques for using multiple symbols to provide feedback for a sidelink transmission in accordance with aspects of the present disclosure. In some examples, process flow 500 may be implemented by aspects of wireless communication system 100 or 200, as well as aspects of resource pattern 301, 302, or 303. In some examples, some aspects of process flow 500 may additionally or alternatively be implemented by aspects of process flow 400 (e.g., if using a frequency hopping pattern). Process flow 500 may be implemented by a base station 105-*b*, UE 115-*e*, and UE 115-*f*, which may be examples of a base station 105 and UEs 115 as described with reference to FIGS. 1-4.

In the following description of the process flow 500, the operations between UE 115-*c*, UE 115-*d*, and base station 105-*a* may be transmitted or performed in a different order than the order shown. Some operations may also be left out of the process flow 500, or other operations may be added to the process flow 500. It is to be understood that while UE 115-*e*, UE 115-*f*, and base station 105-*b* are shown performing the operations of process flow 500, any wireless device may perform the operations shown.

At 505, in some cases, UE 115-*f* may transmit, to UE 115-*e*, an indication of one or more parameters for bundling PRBs within a feedback opportunity (e.g., as described with reference to FIG. 3C). Additionally or alternatively, base station 105-*b* may transmit an indication of the one or more parameters for bundling PRBs within the feedback opportunity to UE 115-*e*, UE 115-*f*, or both (e.g., as described with reference to FIG. 3C). The one or more parameters may include, for example, a number of or a quantity of PRBs to be bundled together for each respective symbol of the feedback opportunity. In some cases, multiple quantities of the bundled PRBs may be configured (e.g., by base station 105-*b*) for a resource pool associated with a sidelink shared channel used for communications between UEs 115-*e* and 115-*f*. In such cases, UE 115-*f* may select the quantity of PRBs from the multiple, configured quantities and may indicate the selected quantity to UE 115-*e*.

In some cases, the one or more parameters may include a starting PRB and a direction in a frequency domain for which the bundling is to extend. In some cases, the one or more parameters (e.g., from UE 115-*f*) may include an indication of multiple, respective offsets for the PRBs, to be used in the feedback opportunity.

At 510, UE 115-*e* may monitor for a sidelink message from UE 115-*f* over the sidelink shared channel, where the sidelink shared channel may be associated with the feedback opportunity. For example, UEs 115-*e* and 115-*f* may communicate with each other via one or more sidelink communications, where UE 115-*f* may be a transmitting device and UE 115-*e* may be a receiving device for at least the sidelink message. In some cases, monitoring for the sidelink message may include receiving the sidelink message. For example, techniques performed by UE 115-*e* in monitoring for the sidelink message may result in, or may include, receiving the sidelink message.

At 515, UE 115-*f* may transmit, to UE 115-*e*, the sidelink message over the sidelink shared channel (PSSCH). For example, UE 115-*d* may transmit the sidelink message using time and frequency resources (e.g., a slot and a sub-channel) as described herein with reference to FIG. 2.

At 520, UE 115-*f* may determine that UE 115-*e* is configured to transmit feedback (e.g., HARQ feedback) via multiple bundled PRBs during a symbol (e.g., an OFDM symbol) of the feedback opportunity (e.g., in accordance with the one or more parameter(s)). Similarly, at 525, UE 115-*e* may determine that UE 115-*e* is configured to transmit the feedback for the sidelink message via a number of bundled PRBs during the symbol of the feedback opportunity (e.g., in accordance with the one or more parameter(s)). In some cases, UE 115-*f* may also determine the bundled PRBs to be used by UE 115-*e* in the feedback opportunity, or may determine one or more parameters associated therewith.

In some cases, determining the bundled PRBs to be used (e.g., by UE 115-*e* or UE 115-*f*) may be based on identifying a number of PRBs to be bundled together, a starting PRB, and a direction in a frequency domain in which the number of PRBs extends from the starting PRB. In other cases, the determination may be based on identifying a number of PRBs to be bundled together and a respective offset for each PRB (e.g., as described with reference to FIGS. 3A through 3C). In some cases, UEs 115-*e* and 115-*f* may determine that the bundled PRBs are also associated with a frequency hopping pattern, which may be determined as described with reference to FIGS. 3A through 3C, and FIG. 4.

At 530, UE 115-*e* may transmit, to UE 115-*f*, the feedback for the sidelink message via the multiple bundled PRBs of the symbol of the feedback opportunity. For example, UE 115-*e* may transmit via the multiple bundled PRBs based on the determination of the PRBs at 525. In some cases, UE 115-*e* may transmit the feedback via one or more additional symbols of the feedback opportunity, where the feedback may be transmitted during each of the one or more additional symbols via respective, additional bundled PRBs (e.g., as described with reference to FIG. 3C). In some cases, UE 115-*e* may transmit the feedback according to a frequency hopping pattern (as described with reference to FIGS. 2 and 3A through 3C) via the one or more additional symbols of the feedback opportunity.

Figure 6:
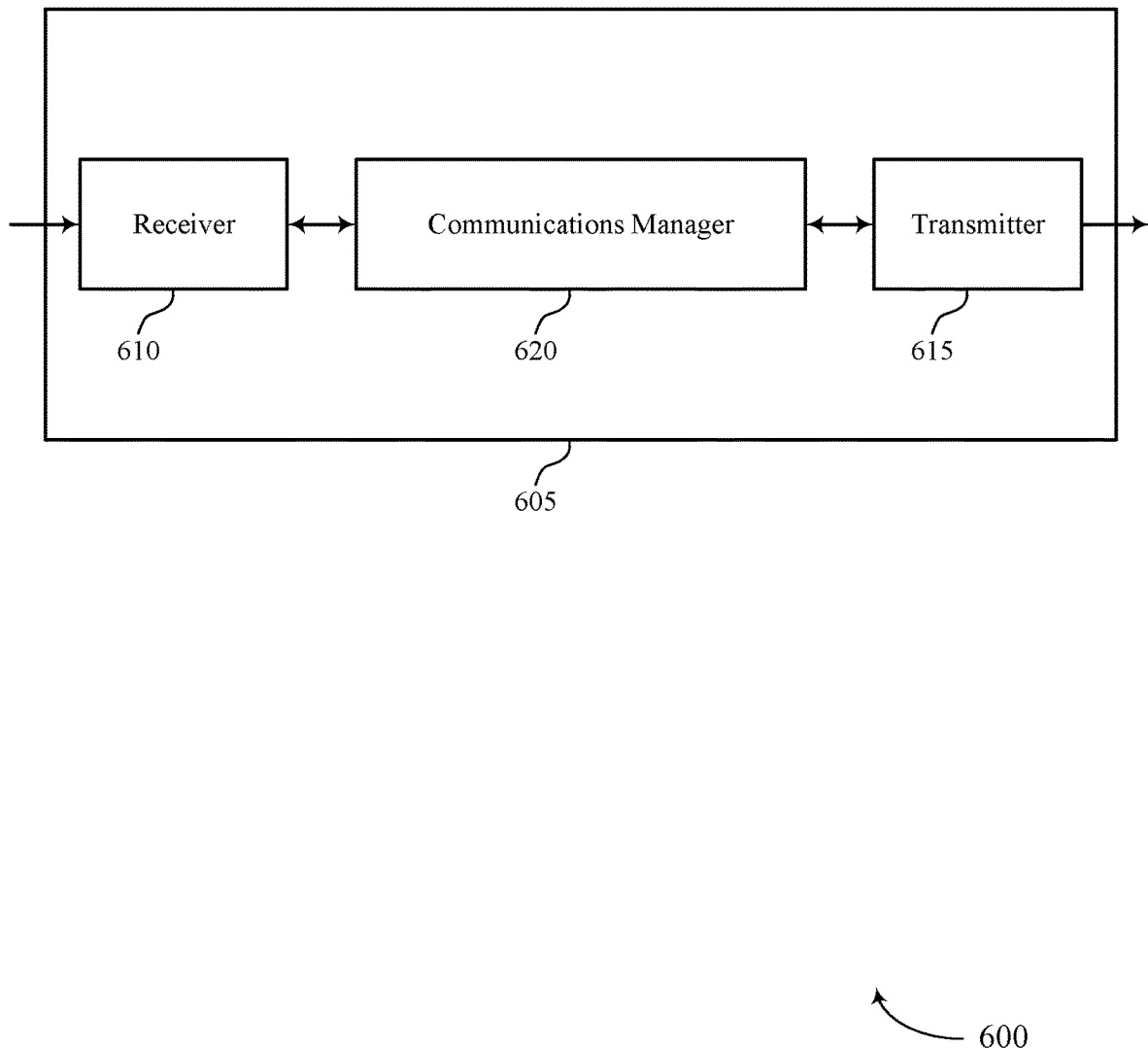
FIGS. 6 and 7 show block diagrams of devices that support techniques for using multiple symbols to provide feedback for a sidelink transmission in accordance with aspects of the present disclosure.

FIG. 6 shows a block diagram 600 of a device 605 that supports techniques for using multiple symbols to provide feedback for a sidelink transmission in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for using multiple symbols to provide feedback for a sidelink transmission). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for using multiple symbols to provide feedback for a sidelink transmission). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of techniques for using multiple symbols to provide feedback for a sidelink transmission as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry), software (e.g., executed by a processor), or any combination thereof. The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a first UE in accordance with examples as disclosed herein. For example, the communications manager 620 may be configured as or otherwise support a means for monitoring for a sidelink message from a second UE over a sidelink shared channel that is associated with a feedback opportunity that includes a set of multiple symbols. The communications manager 620 may be configured as or otherwise support a means for determining a frequency hopping pattern for transmission of feedback via the set of multiple symbols during the feedback opportunity. The communications manager 620 may be configured as or otherwise support a means for transmitting the feedback for the sidelink message to the second UE via the set of multiple symbols of the feedback opportunity in accordance with the frequency hopping pattern.

Additionally or alternatively, the communications manager 620 may support wireless communication at a second UE in accordance with examples as disclosed herein. For example, the communications manager 620 may be configured as or otherwise support a means for transmitting a sidelink message to a first UE over a sidelink shared channel that is associated with a feedback opportunity that includes a set of multiple symbols. The communications manager 620 may be configured as or otherwise support a means for determining a frequency hopping pattern for reception of feedback via the set of multiple symbols during the feedback opportunity. The communications manager 620 may be configured as or otherwise support a means for receiving the feedback for the sidelink message from the first UE via the set of multiple symbols of the feedback opportunity in accordance with the frequency hopping pattern.

Additionally or alternatively, the communications manager 620 may support wireless communication at a first UE in accordance with examples as disclosed herein. For example, the communications manager 620 may be configured as or otherwise support a means for monitoring for a sidelink message from a second UE over a sidelink shared channel that is associated with a feedback opportunity. The communications manager 620 may be configured as or otherwise support a means for determining that the first UE is configured to transmit feedback for the sidelink message via a set of multiple bundled PRBs during a symbol of the feedback opportunity. The communications manager 620 may be configured as or otherwise support a means for transmitting the feedback for the sidelink message to the second UE via the set of multiple bundled PRBs of the symbol of the feedback opportunity.

Additionally or alternatively, the communications manager 620 may support wireless communication at a second UE in accordance with examples as disclosed herein. For example, the communications manager 620 may be configured as or otherwise support a means for transmitting a sidelink message to a first UE over a sidelink shared channel that is associated with a feedback opportunity. The communications manager 620 may be configured as or otherwise support a means for determining that the first UE is configured to transmit feedback for the sidelink message via a set of multiple bundled PRBs during a symbol of the feedback opportunity. The communications manager 620 may be configured as or otherwise support a means for receiving the feedback for the sidelink message from the first UE via the set of multiple bundled PRBs of the symbol of the feedback opportunity.

The actions performed by the communications manager 620, among other examples herein, may be implemented to realize one or more potential advantages. For example, communications manager 620 may increase available battery power, communication quality, and communication reliability at a wireless device (e.g., a UE 115) by supporting transmission of feedback via multiple symbols according to a frequency hopping or PRB bundling pattern, which may increase communication quality at the wireless device by increasing transmission diversity for the feedback transmission. The associated increase in communication quality may result in increased link performance and decreased overhead based on using the frequency hopping or PRB bundling pattern. Accordingly, communications manager 620 may save power and increase battery life at a wireless device (e.g., a UE 115) by strategically increasing a quality of communications at a wireless device (e.g., a UE 115).

Figure 7:
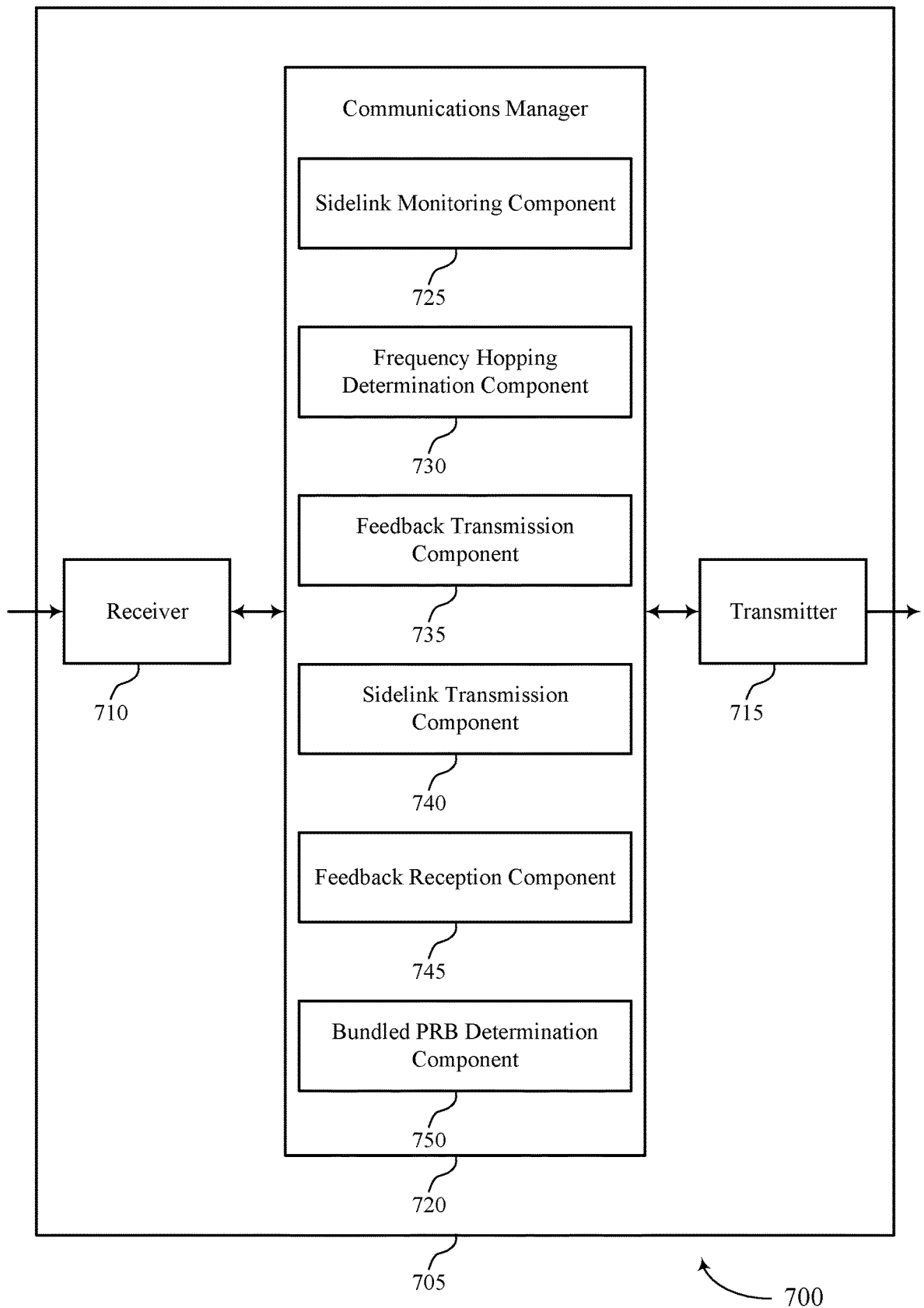

FIG. 7 shows a block diagram 700 of a device 705 that supports techniques for using multiple symbols to provide feedback for a sidelink transmission in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for using multiple symbols to provide feedback for a sidelink transmission). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for using multiple symbols to provide feedback for a sidelink transmission). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of techniques for using multiple symbols to provide feedback for a sidelink transmission as described herein. For example, the communications manager 720 may include a sidelink monitoring component 725, a frequency hopping determination component 730, a feedback transmission component 735, a sidelink transmission component 740, a feedback reception component 745, a bundled PRB determination component 750, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a first UE in accordance with examples as disclosed herein. The sidelink monitoring component 725 may be configured as or otherwise support a means for monitoring for a sidelink message from a second UE over a sidelink shared channel that is associated with a feedback opportunity that includes a set of multiple symbols. The frequency hopping determination component 730 may be configured as or otherwise support a means for determining a frequency hopping pattern for transmission of feedback via the set of multiple symbols during the feedback opportunity. The feedback transmission component 735 may be configured as or otherwise support a means for transmitting the feedback for the sidelink message to the second UE via the set of multiple symbols of the feedback opportunity in accordance with the frequency hopping pattern.

Additionally or alternatively, the communications manager 720 may support wireless communication at a second UE in accordance with examples as disclosed herein. The sidelink transmission component 740 may be configured as or otherwise support a means for transmitting a sidelink message to a first UE over a sidelink shared channel that is associated with a feedback opportunity that includes a set of multiple symbols. The frequency hopping determination component 730 may be configured as or otherwise support a means for determining a frequency hopping pattern for reception of feedback via the set of multiple symbols during the feedback opportunity. The feedback reception component 745 may be configured as or otherwise support a means for receiving the feedback for the sidelink message from the first UE via the set of multiple symbols of the feedback opportunity in accordance with the frequency hopping pattern.

Additionally or alternatively, the communications manager 720 may support wireless communication at a first UE in accordance with examples as disclosed herein. The sidelink monitoring component 725 may be configured as or otherwise support a means for monitoring for a sidelink message from a second UE over a sidelink shared channel that is associated with a feedback opportunity. The bundled PRB determination component 750 may be configured as or otherwise support a means for determining that the first UE is configured to transmit feedback for the sidelink message via a set of multiple bundled PRBs during a symbol of the feedback opportunity. The feedback transmission component 735 may be configured as or otherwise support a means for transmitting the feedback for the sidelink message to the second UE via the set of multiple bundled PRBs of the symbol of the feedback opportunity.

Additionally or alternatively, the communications manager 720 may support wireless communication at a second UE in accordance with examples as disclosed herein. The sidelink transmission component 740 may be configured as or otherwise support a means for transmitting a sidelink message to a first UE over a sidelink shared channel that is associated with a feedback opportunity. The bundled PRB determination component 750 may be configured as or otherwise support a means for determining that the first UE is configured to transmit feedback for the sidelink message via a set of multiple bundled PRBs during a symbol of the feedback opportunity. The feedback reception component 745 may be configured as or otherwise support a means for receiving the feedback for the sidelink message from the first UE via the set of multiple bundled PRBs of the symbol of the feedback opportunity.

A processor of a wireless device (e.g., controlling the receiver 710, the transmitter 715, or the transceiver 915 as described with reference to FIG. 9) may increase available battery power and communication quality. The increased communication quality may increase available battery power and throughput (e.g., via implementation of system components described with reference to FIG. 8) compared to other systems and techniques, for example, that do not support transmission of feedback via multiple symbols according to a frequency hopping or PRB bundling pattern. Further, the processor of the wireless device may identify one or more aspects of the frequency hopping or PRB bundling pattern, which may result in increased communication quality, as well as save power and increase battery life at the wireless device (e.g., by strategically supporting increased transmission diversity), among other benefits.

Figure 8:
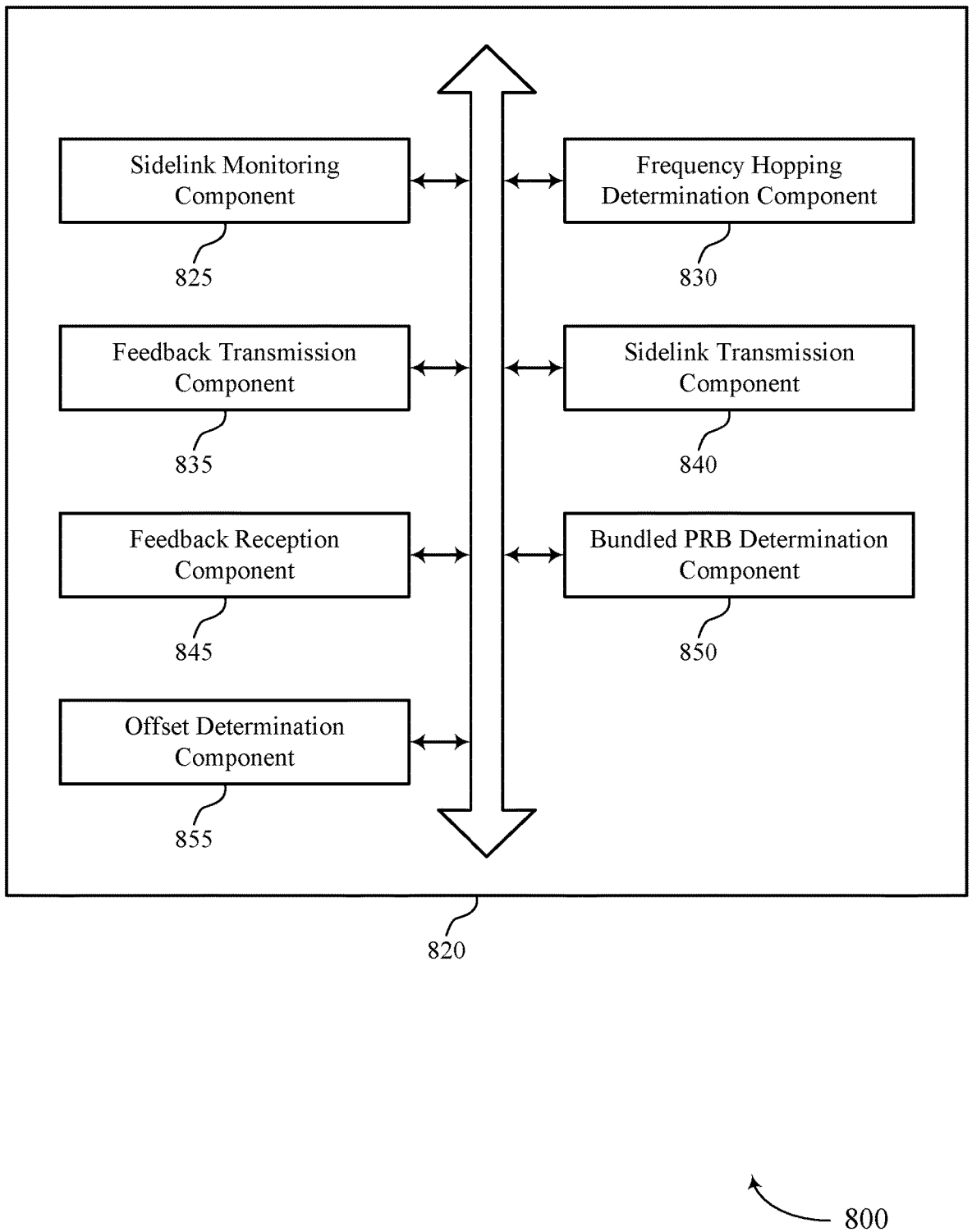
FIG. 8 shows a block diagram of a communications manager that supports techniques for using multiple symbols to provide feedback for a sidelink transmission in accordance with aspects of the present disclosure.

FIG. 8 shows a block diagram 800 of a communications manager 820 that supports techniques for using multiple symbols to provide feedback for a sidelink transmission in accordance with aspects of the present disclosure. The communications manager 820 may be an example of aspects of a communications manager 620, a communications manager 720, or both, as described herein. The communications manager 820, or various components thereof, may be an example of means for performing various aspects of techniques for using multiple symbols to provide feedback for a sidelink transmission as described herein. For example, the communications manager 820 may include a sidelink monitoring component 825, a frequency hopping determination component 830, a feedback transmission component 835, a sidelink transmission component 840, a feedback reception component 845, a bundled PRB determination component 850, an offset determination component 855, or any combination thereof. Each of these components may communicate, directly or indirectly, with one another (e.g., via one or more buses).

The communications manager 820 may support wireless communication at a first UE in accordance with examples as disclosed herein. The sidelink monitoring component 825 may be configured as or otherwise support a means for monitoring for a sidelink message from a second UE over a sidelink shared channel that is associated with a feedback opportunity that includes a set of multiple symbols. The frequency hopping determination component 830 may be configured as or otherwise support a means for determining a frequency hopping pattern for transmission of feedback via the set of multiple symbols during the feedback opportunity. The feedback transmission component 835 may be configured as or otherwise support a means for transmitting the feedback for the sidelink message to the second UE via the set of multiple symbols of the feedback opportunity in accordance with the frequency hopping pattern.

In some examples, to support determining the frequency hopping pattern, the frequency hopping determination component 830 may be configured as or otherwise support a means for receiving, from a base station, an indication of the frequency hopping pattern. In some examples, to support determining the frequency hopping pattern, the frequency hopping determination component 830 may be configured as or otherwise support a means for receiving, from a base station, one or more parameters to be used by the first UE in determining the frequency hopping pattern.

In some examples, to support determining the frequency hopping pattern, the frequency hopping determination component 830 may be configured as or otherwise support a means for determining a set of multiple PRBs for transmission of the feedback in accordance with the frequency hopping pattern, where each PRB of the set of multiple PRBs is associated with both a respective symbol of the set of multiple symbols and a PRB index, where the PRB index is based on a PRB offset for the respective symbol.

In some examples, to support determining the frequency hopping pattern, the frequency hopping determination component 830 may be configured as or otherwise support a means for determining the PRB index for each of the set of multiple PRBs based on an initial offset that is UE-specific and that applies to each of the set of multiple symbols.

In some examples, the offset determination component 855 may be configured as or otherwise support a means for receiving an indication of the initial offset. In some examples, to support receiving the indication of the initial offset, the offset determination component 855 may be configured as or otherwise support a means for receiving the indication of the initial offset from the second UE, where the initial offset is UE-specific to the second UE.

In some examples, the offset determination component 855 may be configured as or otherwise support a means for transmitting, to the second UE, an additional indication of a preferred initial offset, where receiving the indication of the initial offset is based on transmitting the additional indication of the preferred initial offset. In some examples, the offset determination component 855 may be configured as or otherwise support a means for selecting the initial offset at the first UE.

In some examples, to support determining the frequency hopping pattern, the frequency hopping determination component 830 may be configured as or otherwise support a means for applying a staircase algorithm where the PRB offset for each of the set of multiple symbols increments by one PRB index per consecutive symbol of the set of multiple symbols. In some examples, the PRB offset for two consecutive symbols of the set of multiple symbols wraps from a last PRB index to a first PRB index.

In some examples, to support determining the frequency hopping pattern, the frequency hopping determination component 830 may be configured as or otherwise support a means for applying a bit-reversal permutation algorithm where the PRB offset for each of the set of multiple symbols is a reversal of a binary representation of each of the set of multiple symbols.

In some examples, the frequency hopping determination component 830 may be configured as or otherwise support a means for receiving signaling indicating that an algorithm to be used by the first UE to determine the frequency hopping pattern is based on a resource pool associated with the sidelink shared channel. In some examples, the frequency hopping determination component 830 may be configured as or otherwise support a means for receiving signaling indicating an algorithm to be used by the first UE to determine the frequency hopping pattern for all sidelink feedback channel communications associated with any sidelink resource pools.

Additionally or alternatively, the communications manager 820 may support wireless communication at a second UE in accordance with examples as disclosed herein. The sidelink transmission component 840 may be configured as or otherwise support a means for transmitting a sidelink message to a first UE over a sidelink shared channel that is associated with a feedback opportunity that includes a set of multiple symbols. In some examples, the frequency hopping determination component 830 may be configured as or otherwise support a means for determining a frequency hopping pattern for reception of feedback via the set of multiple symbols during the feedback opportunity. The feedback reception component 845 may be configured as or otherwise support a means for receiving the feedback for the sidelink message from the first UE via the set of multiple symbols of the feedback opportunity in accordance with the frequency hopping pattern.

In some examples, to support determining the frequency hopping pattern, the frequency hopping determination component 830 may be configured as or otherwise support a means for receiving, from a base station, an indication of the frequency hopping pattern. In some examples, to support determining the frequency hopping pattern, the frequency hopping determination component 830 may be configured as or otherwise support a means for receiving, from a base station, one or more parameters to be used by the second UE in determining the frequency hopping pattern.

In some examples, to support determining the frequency hopping pattern, the frequency hopping determination component 830 may be configured as or otherwise support a means for determining a set of multiple PRBs for reception of the feedback in accordance with the frequency hopping pattern, where each PRB of the set of multiple PRBs is associated with both a respective symbol of the set of multiple symbols and a PRB index, where the PRB index is based on a PRB offset for the respective symbol.

In some examples, to support determining the frequency hopping pattern, the frequency hopping determination component 830 may be configured as or otherwise support a means for determining the PRB index for each of the set of multiple PRBs based on an initial offset that is UE-specific and that applies to each of the set of multiple symbols.

In some examples, the offset determination component 855 may be configured as or otherwise support a means for transmitting an indication of the initial offset to the first UE, where the initial offset is UE-specific to the second UE. In some examples, the offset determination component 855 may be configured as or otherwise support a means for receiving, from the first UE, an additional indication of a preferred initial offset, where transmitting the indication of the initial offset is based on receiving the additional indication of the preferred initial offset.

In some examples, to support determining the frequency hopping pattern, the frequency hopping determination component 830 may be configured as or otherwise support a means for applying a staircase algorithm where the PRB offset for each of the set of multiple symbols increments by one PRB index per consecutive symbol of the set of multiple symbols. In some examples, the PRB offset for two consecutive symbols of the set of multiple symbols wraps from a last PRB index to a first PRB index.

In some examples, to support determining the frequency hopping pattern, the frequency hopping determination component 830 may be configured as or otherwise support a means for applying a bit-reversal permutation algorithm where the PRB offset for each of the set of multiple symbols is a reversal of a binary representation of each of the set of multiple symbols.

In some examples, the frequency hopping determination component 830 may be configured as or otherwise support a means for receiving signaling indicating that an algorithm to be used by the second UE to determine the frequency hopping pattern is based on a resource pool associated with the sidelink shared channel. In some examples, the frequency hopping determination component 830 may be configured as or otherwise support a means for receiving signaling indicating an algorithm to be used by the second UE to determine the frequency hopping pattern for all sidelink feedback channel communications associated with any sidelink resource pools.

Additionally or alternatively, the communications manager 820 may support wireless communication at a first UE in accordance with examples as disclosed herein. In some examples, the sidelink monitoring component 825 may be configured as or otherwise support a means for monitoring for a sidelink message from a second UE over a sidelink shared channel that is associated with a feedback opportunity. The bundled PRB determination component 850 may be configured as or otherwise support a means for determining that the first UE is configured to transmit feedback for the sidelink message via a set of multiple bundled PRBs during a symbol of the feedback opportunity. In some examples, the feedback transmission component 835 may be configured as or otherwise support a means for transmitting the feedback for the sidelink message to the second UE via the set of multiple bundled PRBs of the symbol of the feedback opportunity.

In some examples, to support transmitting the feedback for the sidelink message, the feedback transmission component 835 may be configured as or otherwise support a means for transmitting the feedback for the sidelink message to the second UE via one or more additional symbols of the feedback opportunity in accordance with a frequency hopping pattern, where the feedback is transmitted during each of the one or more additional symbols via respective additional pluralities of bundled resource blocks.

In some examples, to support determining that the first UE is configured to transmit feedback for the sidelink message via the set of multiple bundled PRBs, the bundled PRB determination component 850 may be configured as or otherwise support a means for identifying a quantity of PRBs to be bundled together in the set of multiple bundled PRBs. In some examples, to support determining that the first UE is configured to transmit feedback for the sidelink message via the set of multiple bundled PRBs, the bundled PRB determination component 850 may be configured as or otherwise support a means for determining the set of multiple bundled PRBs based on the quantity, a starting PRB of the set of multiple bundled PRBs, and a direction in a frequency domain in which the set of multiple bundled PRBs extends from the starting PRB.

In some examples, to support identifying the quantity, the bundled PRB determination component 850 may be configured as or otherwise support a means for receiving, from the second UE, an indication of the quantity of the PRBs to be bundled together in the set of multiple bundled PRBs.

In some examples, to support determining that the first UE is configured to transmit feedback for the sidelink message via the set of multiple bundled PRBs, the bundled PRB determination component 850 may be configured as or otherwise support a means for identifying a quantity of PRBs to be bundled together in the set of multiple bundled PRBs. In some examples, to support determining that the first UE is configured to transmit feedback for the sidelink message via the set of multiple bundled PRBs, the bundled PRB determination component 850 may be configured as or otherwise support a means for determining the set of multiple bundled PRBs based on the quantity and a respective offset for each of the PRBs to be bundled together in the set of multiple bundled PRBs.

In some examples, the bundled PRB determination component 850 may be configured as or otherwise support a means for receiving an indication of the respective offsets from the second UE. In some examples, the bundled PRB determination component 850 may be configured as or otherwise support a means for receiving, from a base station, an indication of a quantity of PRBs to be bundled together in the set of multiple bundled PRBs, where the quantity is configured for a resource pool associated with the sidelink shared channel.

In some examples, the bundled PRB determination component 850 may be configured as or otherwise support a means for receiving, from the second UE, an indication of a quantity of PRBs to be bundled together in the set of multiple bundled PRBs, where multiple quantities for the set of multiple bundled PRBs are configured for a resource pool associated with the sidelink shared channel.

Additionally or alternatively, the communications manager 820 may support wireless communication at a second UE in accordance with examples as disclosed herein. In some examples, the sidelink transmission component 840 may be configured as or otherwise support a means for transmitting a sidelink message to a first UE over a sidelink shared channel that is associated with a feedback opportunity. In some examples, the bundled PRB determination component 850 may be configured as or otherwise support a means for determining that the first UE is configured to transmit feedback for the sidelink message via a set of multiple bundled PRBs during a symbol of the feedback opportunity. In some examples, the feedback reception component 845 may be configured as or otherwise support a means for receiving the feedback for the sidelink message from the first UE via the set of multiple bundled PRBs of the symbol of the feedback opportunity.

In some examples, to support receiving the feedback for the sidelink message, the feedback reception component 845 may be configured as or otherwise support a means for receiving the feedback for the sidelink message from the first UE via one or more additional symbols of the feedback opportunity in accordance with a frequency hopping pattern, where the feedback is transmitted during each of the one or more additional symbols via respective additional pluralities of bundled resource blocks.

In some examples, to support determining that the first UE is configured to transmit feedback for the sidelink message via the set of multiple bundled PRBs, the bundled PRB determination component 850 may be configured as or otherwise support a means for identifying a quantity of PRBs to be bundled together in the set of multiple bundled PRBs. In some examples, to support determining that the first UE is configured to transmit feedback for the sidelink message via the set of multiple bundled PRBs, the bundled PRB determination component 850 may be configured as or otherwise support a means for determining the set of multiple bundled PRBs based on the quantity, a starting PRB of the set of multiple bundled PRBs, and a direction in a frequency domain in which the set of multiple bundled PRBs extends from the starting PRB.

In some examples, to support identifying the quantity, the bundled PRB determination component 850 may be configured as or otherwise support a means for transmitting, to the first UE, an indication of the quantity of the PRBs to be bundled together in the set of multiple bundled PRBs.

In some examples, to support determining that the first UE is configured to transmit feedback for the sidelink message via the set of multiple bundled PRBs, the bundled PRB determination component 850 may be configured as or otherwise support a means for identifying a quantity of PRBs to be bundled together in the set of multiple bundled PRBs. In some examples, to support determining that the first UE is configured to transmit feedback for the sidelink message via the set of multiple bundled PRBs, the bundled PRB determination component 850 may be configured as or otherwise support a means for determining the set of multiple bundled PRBs based on the quantity and a respective offset for each of the PRBs to be bundled together in the set of multiple bundled PRBs.

In some examples, the bundled PRB determination component 850 may be configured as or otherwise support a means for transmitting an indication of the respective offsets to the first UE. In some examples, the bundled PRB determination component 850 may be configured as or otherwise support a means for receiving, from a base station, an indication of a quantity of PRBs to be bundled together in the set of multiple bundled PRBs, where the quantity is configured for a resource pool associated with the sidelink shared channel.

In some examples, the bundled PRB determination component 850 may be configured as or otherwise support a means for transmitting, to the first UE, an indication of a quantity of PRBs to be bundled together in the set of multiple bundled PRBs, where multiple quantities for the set of multiple bundled PRBs are configured for a resource pool associated with the sidelink shared channel.

Figure 9:
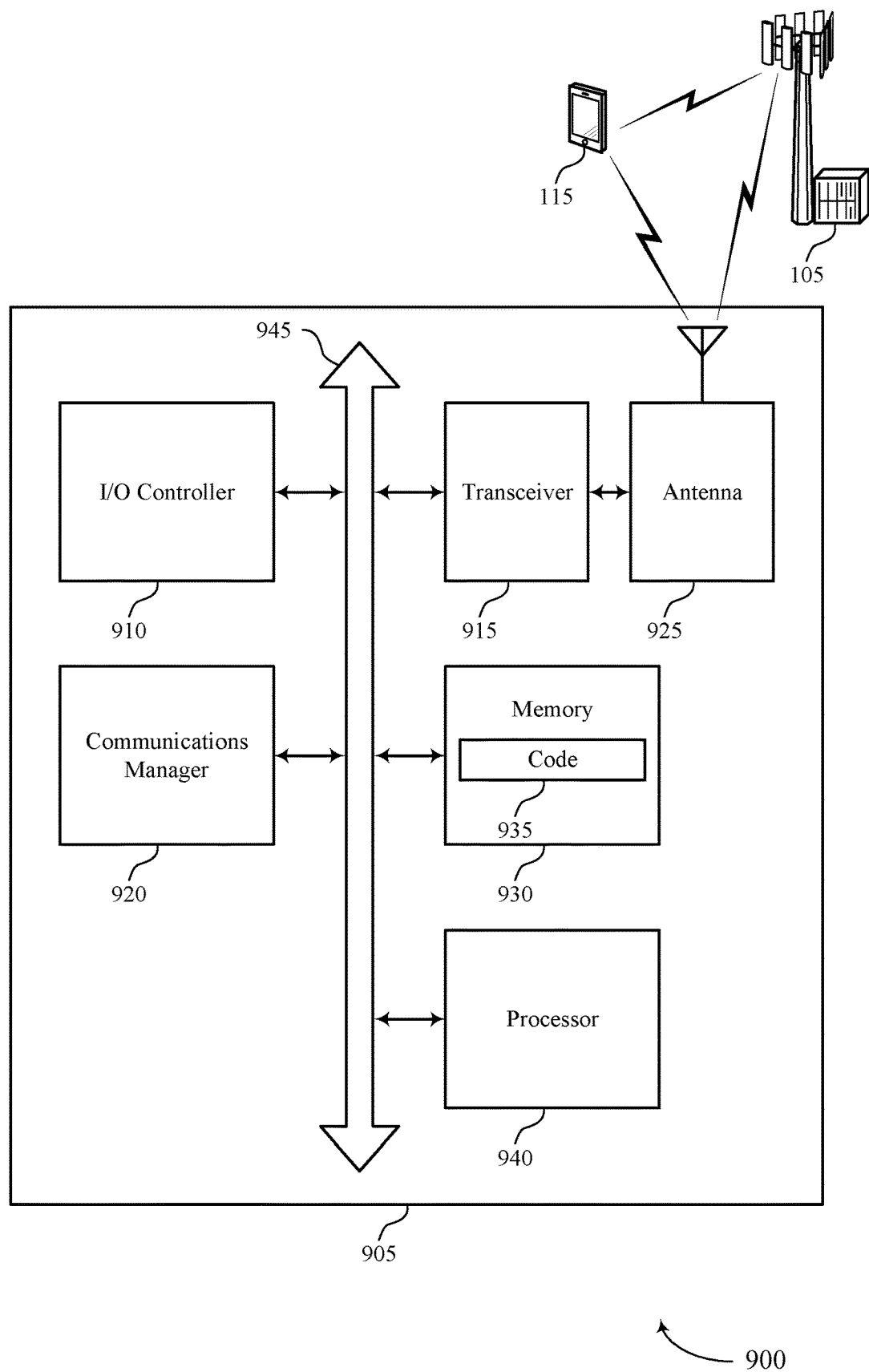
FIG. 9 shows a diagram of a system including a device that supports techniques for using multiple symbols to provide feedback for a sidelink transmission in accordance with aspects of the present disclosure.

FIG. 9 shows a diagram of a system 900 including a device 905 that supports techniques for using multiple symbols to provide feedback for a sidelink transmission in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting techniques for using multiple symbols to provide feedback for a sidelink transmission). For example, the device 905 or a component of the device 905 may include a processor 940 and memory 930 coupled to the processor 940, the processor 940 and memory 930 configured to perform various functions described herein.

The communications manager 920 may support wireless communication at a first UE in accordance with examples as disclosed herein. For example, the communications manager 920 may be configured as or otherwise support a means for monitoring for a sidelink message from a second UE over a sidelink shared channel that is associated with a feedback opportunity that includes a set of multiple symbols. The communications manager 920 may be configured as or otherwise support a means for determining a frequency hopping pattern for transmission of feedback via the set of multiple symbols during the feedback opportunity. The communications manager 920 may be configured as or otherwise support a means for transmitting the feedback for the sidelink message to the second UE via the set of multiple symbols of the feedback opportunity in accordance with the frequency hopping pattern.

Additionally or alternatively, the communications manager 920 may support wireless communication at a second UE in accordance with examples as disclosed herein. For example, the communications manager 920 may be configured as or otherwise support a means for transmitting a sidelink message to a first UE over a sidelink shared channel that is associated with a feedback opportunity that includes a set of multiple symbols. The communications manager 920 may be configured as or otherwise support a means for determining a frequency hopping pattern for reception of feedback via the set of multiple symbols during the feedback opportunity. The communications manager 920 may be configured as or otherwise support a means for receiving the feedback for the sidelink message from the first UE via the set of multiple symbols of the feedback opportunity in accordance with the frequency hopping pattern.

Additionally or alternatively, the communications manager 920 may support wireless communication at a first UE in accordance with examples as disclosed herein. For example, the communications manager 920 may be configured as or otherwise support a means for monitoring for a sidelink message from a second UE over a sidelink shared channel that is associated with a feedback opportunity. The communications manager 920 may be configured as or otherwise support a means for determining that the first UE is configured to transmit feedback for the sidelink message via a set of multiple bundled PRBs during a symbol of the feedback opportunity. The communications manager 920 may be configured as or otherwise support a means for transmitting the feedback for the sidelink message to the second UE via the set of multiple bundled PRBs of the symbol of the feedback opportunity.

Additionally or alternatively, the communications manager 920 may support wireless communication at a second UE in accordance with examples as disclosed herein. For example, the communications manager 920 may be configured as or otherwise support a means for transmitting a sidelink message to a first UE over a sidelink shared channel that is associated with a feedback opportunity. The communications manager 920 may be configured as or otherwise support a means for determining that the first UE is configured to transmit feedback for the sidelink message via a set of multiple bundled PRBs during a symbol of the feedback opportunity. The communications manager 920 may be configured as or otherwise support a means for receiving the feedback for the sidelink message from the first UE via the set of multiple bundled PRBs of the symbol of the feedback opportunity.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of techniques for using multiple symbols to provide feedback for a sidelink transmission as described herein, or the processor 940 and the memory 930 may be otherwise configured to perform or support such operations.

Figure 10:
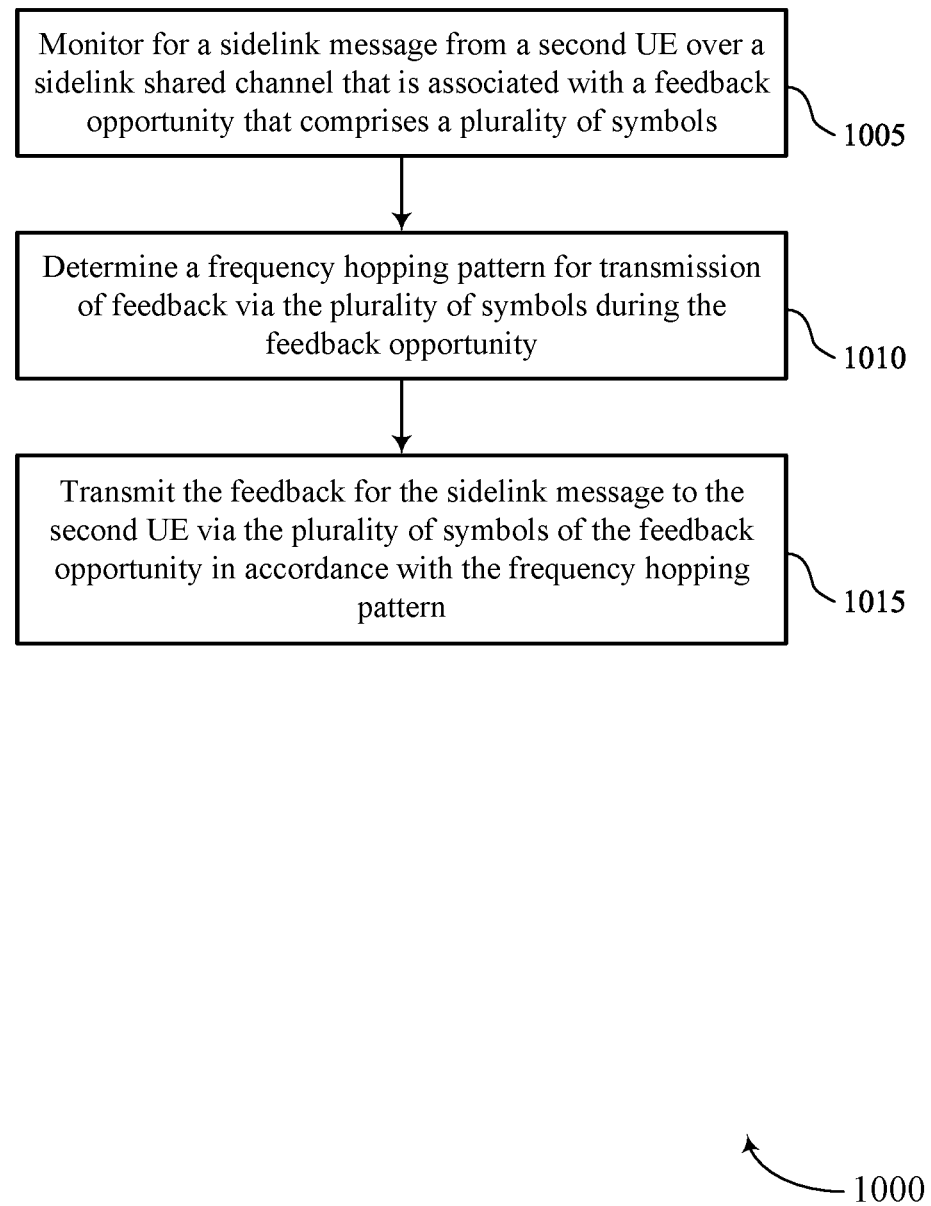
FIGS. 10 through 13 show flowcharts illustrating methods that support techniques for using multiple symbols to provide feedback for a sidelink transmission in accordance with aspects of the present disclosure.

FIG. 10 shows a flowchart illustrating a method 1000 that supports techniques for using multiple symbols to provide feedback for a sidelink transmission in accordance with aspects of the present disclosure. The operations of the method 1000 may be implemented by a UE or its components as described herein. For example, the operations of the method 1000 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1005, the method may include monitoring for a sidelink message from a second UE over a sidelink shared channel that is associated with a feedback opportunity that includes a set of multiple symbols. The operations of 1005 may be performed in accordance with examples as disclosed herein. In some examples, aspects of the operations of 1005 may be performed by a sidelink monitoring component 825 as described with reference to FIG. 8.

At 1010, the method may include determining a frequency hopping pattern for transmission of feedback via the set of multiple symbols during the feedback opportunity. The operations of 1010 may be performed in accordance with examples as disclosed herein. In some examples, aspects of the operations of 1010 may be performed by a frequency hopping determination component 830 as described with reference to FIG. 8.

At 1015, the method may include transmitting the feedback for the sidelink message to the second UE via the set of multiple symbols of the feedback opportunity in accordance with the frequency hopping pattern. The operations of 1015 may be performed in accordance with examples as disclosed herein. In some examples, aspects of the operations of 1015 may be performed by a feedback transmission component 835 as described with reference to FIG. 8.

Figure 11:
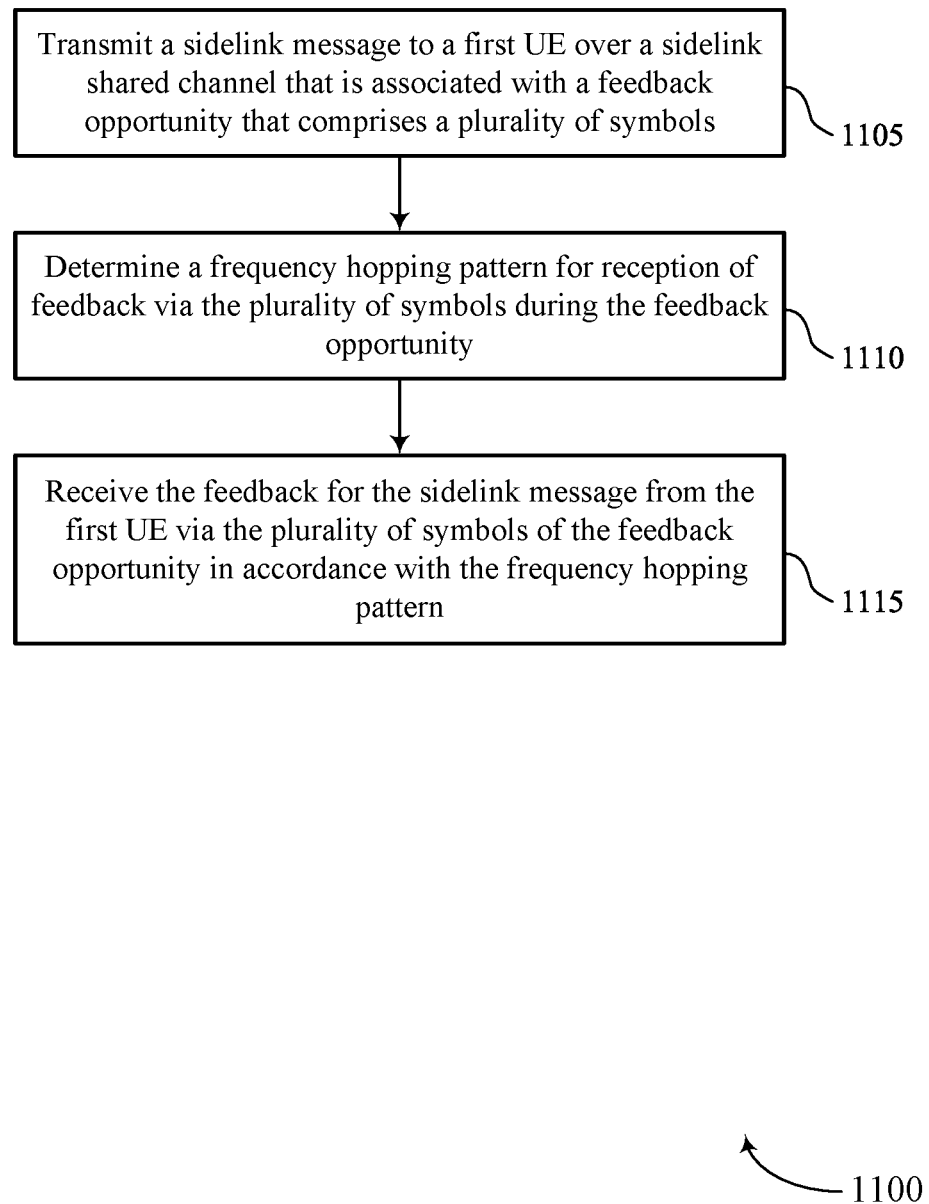

FIG. 11 shows a flowchart illustrating a method 1100 that supports techniques for using multiple symbols to provide feedback for a sidelink transmission in accordance with aspects of the present disclosure. The operations of the method 1100 may be implemented by a UE or its components as described herein. For example, the operations of the method 1100 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1105, the method may include transmitting a sidelink message to a first UE over a sidelink shared channel that is associated with a feedback opportunity that includes a set of multiple symbols. The operations of 1105 may be performed in accordance with examples as disclosed herein. In some examples, aspects of the operations of 1105 may be performed by a sidelink transmission component 840 as described with reference to FIG. 8.

At 1110, the method may include determining a frequency hopping pattern for reception of feedback via the set of multiple symbols during the feedback opportunity. The operations of 1110 may be performed in accordance with examples as disclosed herein. In some examples, aspects of the operations of 1110 may be performed by a frequency hopping determination component 830 as described with reference to FIG. 8.

At 1115, the method may include receiving the feedback for the sidelink message from the first UE via the set of multiple symbols of the feedback opportunity in accordance with the frequency hopping pattern. The operations of 1115 may be performed in accordance with examples as disclosed herein. In some examples, aspects of the operations of 1115 may be performed by a feedback reception component 845 as described with reference to FIG. 8.

Figure 12:
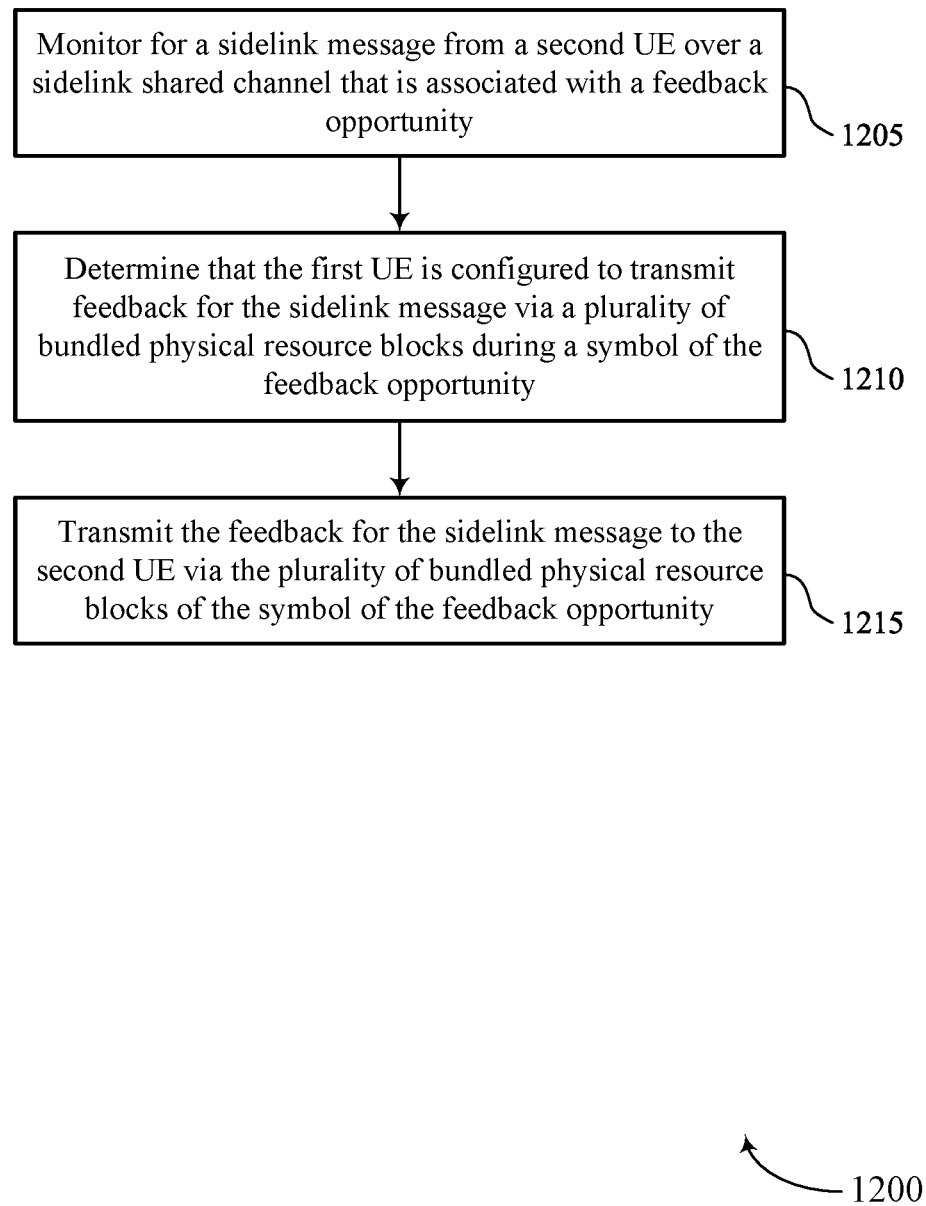

FIG. 12 shows a flowchart illustrating a method 1200 that supports techniques for using multiple symbols to provide feedback for a sidelink transmission in accordance with aspects of the present disclosure. The operations of the method 1200 may be implemented by a UE or its components as described herein. For example, the operations of the method 1200 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1205, the method may include monitoring for a sidelink message from a second UE over a sidelink shared channel that is associated with a feedback opportunity. The operations of 1205 may be performed in accordance with examples as disclosed herein. In some examples, aspects of the operations of 1205 may be performed by a sidelink monitoring component 825 as described with reference to FIG. 8.

At 1210, the method may include determining that the first UE is configured to transmit feedback for the sidelink message via a set of multiple bundled PRBs during a symbol of the feedback opportunity. The operations of 1210 may be performed in accordance with examples as disclosed herein. In some examples, aspects of the operations of 1210 may be performed by a bundled PRB determination component 850 as described with reference to FIG. 8.

At 1215, the method may include transmitting the feedback for the sidelink message to the second UE via the set of multiple bundled PRBs of the symbol of the feedback opportunity. The operations of 1215 may be performed in accordance with examples as disclosed herein. In some examples, aspects of the operations of 1215 may be performed by a feedback transmission component 835 as described with reference to FIG. 8.

Figure 13:
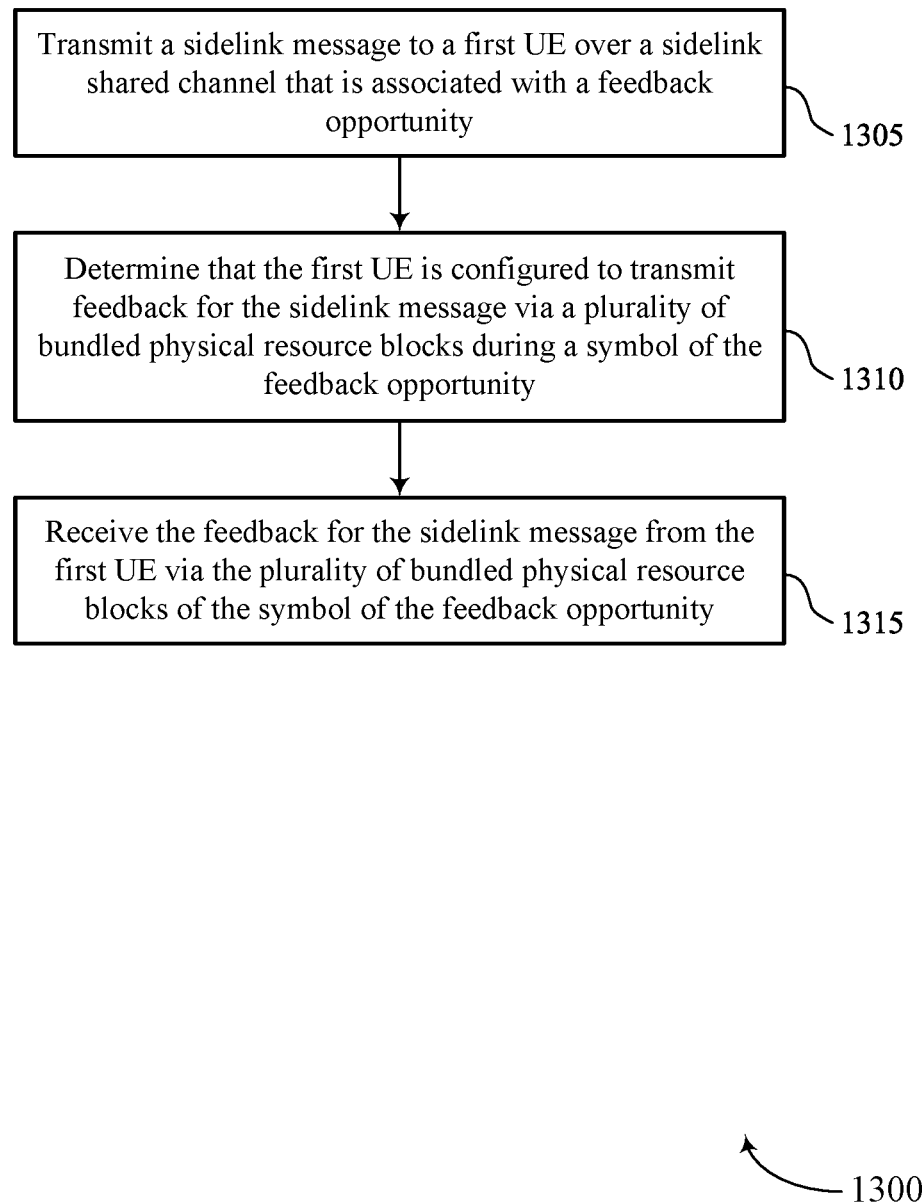

FIG. 13 shows a flowchart illustrating a method 1300 that supports techniques for using multiple symbols to provide feedback for a sidelink transmission in accordance with aspects of the present disclosure. The operations of the method 1300 may be implemented by a UE or its components as described herein. For example, the operations of the method 1300 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1305, the method may include transmitting a sidelink message to a first UE over a sidelink shared channel that is associated with a feedback opportunity. The operations of 1305 may be performed in accordance with examples as disclosed herein. In some examples, aspects of the operations of 1305 may be performed by a sidelink transmission component 840 as described with reference to FIG. 8.

At 1310, the method may include determining that the first UE is configured to transmit feedback for the sidelink message via a set of multiple bundled PRBs during a symbol of the feedback opportunity. The operations of 1310 may be performed in accordance with examples as disclosed herein. In some examples, aspects of the operations of 1310 may be performed by a bundled PRB determination component 850 as described with reference to FIG. 8.

At 1315, the method may include receiving the feedback for the sidelink message from the first UE via the set of multiple bundled PRBs of the symbol of the feedback opportunity. The operations of 1315 may be performed in accordance with examples as disclosed herein. In some examples, aspects of the operations of 1315 may be performed by a feedback reception component 845 as described with reference to FIG. 8.

The following provides an overview of aspects of the present disclosure:

Aspect 1: A method for wireless communication at a first UE, comprising: monitoring for a sidelink message from a second UE over a sidelink shared channel that is associated with a feedback opportunity that comprises a plurality of symbols; determining a frequency hopping pattern for transmission of feedback via the plurality of symbols during the feedback opportunity; and transmitting the feedback for the sidelink message to the second UE via the plurality of symbols of the feedback opportunity in accordance with the frequency hopping pattern.

Aspect 2: The method of aspect 1, wherein determining the frequency hopping pattern further comprises: receiving, from a base station, an indication of the frequency hopping pattern.

Aspect 3: The method of any of aspects 1 through 2, wherein determining the frequency hopping pattern further comprises: receiving, from a base station, one or more parameters to be used by the first UE in determining the frequency hopping pattern.

Aspect 4: The method of any of aspects 1 through 3, wherein determining the frequency hopping pattern further comprises: determining a plurality of PRBs for transmission of the feedback in accordance with the frequency hopping pattern, wherein each PRB of the plurality of PRBs is associated with both a respective symbol of the plurality of symbols and a PRB index, wherein the PRB index is based at least in part on a PRB offset for the respective symbol.

Aspect 5: The method of aspect 4, wherein determining the frequency hopping pattern further comprises: determining the PRB index for each of the plurality of PRBs based at least in part on an initial offset that is UE-specific and that applies to each of the plurality of symbols.

Aspect 6: The method of aspect 5, further comprising: receiving an indication of the initial offset.

Aspect 7: The method of aspect 6, wherein receiving the indication of the initial offset comprises: receiving the indication of the initial offset from the second UE, wherein the initial offset is UE-specific to the second UE.

Aspect 8: The method of any of aspects 6 through 7, further comprising: transmitting, to the second UE, an additional indication of a preferred initial offset, wherein receiving the indication of the initial offset is based at least in part on transmitting the additional indication of the preferred initial offset.

Aspect 9: The method of aspect 5, further comprising: selecting the initial offset at the first UE.

Aspect 10: The method of any of aspects 4 through 9, wherein determining the frequency hopping pattern further comprises: applying a staircase algorithm wherein the PRB offset for each of the plurality of symbols increments by one PRB index per consecutive symbol of the plurality of symbols.

Aspect 11: The method of aspect 10, wherein the PRB offset for two consecutive symbols of the plurality of symbols wraps from a last PRB index to a first PRB index.

Aspect 12: The method of any of aspects 4 through 9, wherein determining the frequency hopping pattern further comprises: applying a bit-reversal permutation algorithm wherein the PRB offset for each of the plurality of symbols is a reversal of a binary representation of each of the plurality of symbols.

Aspect 13: The method of any of aspects 1 through 12, further comprising: receiving signaling indicating that an algorithm to be used by the first UE to determine the frequency hopping pattern is based at least in part on a resource pool associated with the sidelink shared channel.

Aspect 14: The method of any of aspects 1 through 12, further comprising: receiving signaling indicating an algorithm to be used by the first UE to determine the frequency hopping pattern for all sidelink feedback channel communications associated with any sidelink resource pools.

Aspect 15: A method for wireless communication at a second UE, comprising: transmitting a sidelink message to a first UE over a sidelink shared channel that is associated with a feedback opportunity that comprises a plurality of symbols; determining a frequency hopping pattern for reception of feedback via the plurality of symbols during the feedback opportunity; and receiving the feedback for the sidelink message from the first UE via the plurality of symbols of the feedback opportunity in accordance with the frequency hopping pattern.

Aspect 16: The method of aspect 15, wherein determining the frequency hopping pattern further comprises: receiving, from a base station, an indication of the frequency hopping pattern.

Aspect 17: The method of any of aspects 15 through 16, wherein determining the frequency hopping pattern further comprises: receiving, from a base station, one or more parameters to be used by the second UE in determining the frequency hopping pattern.

Aspect 18: The method of any of aspects 15 through 17, wherein determining the frequency hopping pattern further comprises: determining a plurality of PRBs for reception of the feedback in accordance with the frequency hopping pattern, wherein each PRB of the plurality of PRBs is associated with both a respective symbol of the plurality of symbols and a PRB index, wherein the PRB index is based at least in part on a PRB offset for the respective symbol.

Aspect 19: The method of aspect 18, wherein determining the frequency hopping pattern further comprises: determining the PRB index for each of the plurality of PRBs based at least in part on an initial offset that is UE-specific and that applies to each of the plurality of symbols.

Aspect 20: The method of aspect 19, further comprising: transmitting an indication of the initial offset to the first UE, wherein the initial offset is UE-specific to the second UE.

Aspect 21: The method of aspect 20, further comprising: receiving, from the first UE, an additional indication of a preferred initial offset, wherein transmitting the indication of the initial offset is based at least in part on receiving the additional indication of the preferred initial offset.

Aspect 22: The method of any of aspects 18 through 21, wherein determining the frequency hopping pattern further comprises: applying a staircase algorithm wherein the PRB offset for each of the plurality of symbols increments by one PRB index per consecutive symbol of the plurality of symbols.

Aspect 23: The method of aspect 22, wherein the PRB offset for two consecutive symbols of the plurality of symbols wraps from a last PRB index to a first PRB index.

Aspect 24: The method of any of aspects 18 through 21, wherein determining the frequency hopping pattern further comprises: applying a bit-reversal permutation algorithm wherein the PRB offset for each of the plurality of symbols is a reversal of a binary representation of each of the plurality of symbols.

Aspect 25: The method of any of aspects 15 through 24, further comprising: receiving signaling indicating that an algorithm to be used by the second UE to determine the frequency hopping pattern is based at least in part on a resource pool associated with the sidelink shared channel.

Aspect 26: The method of any of aspects 15 through 24, further comprising: receiving signaling indicating an algorithm to be used by the second UE to determine the frequency hopping pattern for all sidelink feedback channel communications associated with any sidelink resource pools.

Aspect 27: A method for wireless communication at a first UE, comprising: monitoring for a sidelink message from a second UE over a sidelink shared channel that is associated with a feedback opportunity; determining that the first UE is configured to transmit feedback for the sidelink message via a plurality of bundled PRBs during a symbol of the feedback opportunity; and transmitting the feedback for the sidelink message to the second UE via the plurality of bundled PRBs of the symbol of the feedback opportunity.

Aspect 28: The method of aspect 27, wherein transmitting the feedback for the sidelink message further comprises: transmitting the feedback for the sidelink message to the second UE via one or more additional symbols of the feedback opportunity in accordance with a frequency hopping pattern, wherein the feedback is transmitted during each of the one or more additional symbols via respective additional pluralities of bundled resource blocks.

Aspect 29: The method of any of aspects 27 through 28, wherein determining that the first UE is configured to transmit feedback for the sidelink message via the plurality of bundled PRBs further comprises: identifying a quantity of PRBs to be bundled together in the plurality of bundled PRBs; and determining the plurality of bundled PRBs based at least in part on the quantity, a starting PRB of the plurality of bundled PRBs, and a direction in a frequency domain in which the plurality of bundled PRBs extends from the starting PRB.

Aspect 30: The method of aspect 29, wherein identifying the quantity further comprises: receiving, from the second UE, an indication of the quantity of the PRBs to be bundled together in the plurality of bundled PRBs.

Aspect 31: The method of any of aspects 27 through 28, wherein determining that the first UE is configured to transmit feedback for the sidelink message via the plurality of bundled PRBs further comprises: identifying a quantity of PRBs to be bundled together in the plurality of bundled PRBs; and determining the plurality of bundled PRBs based at least in part on the quantity and a respective offset for each of the PRBs to be bundled together in the plurality of bundled PRBs.

Aspect 32: The method of aspect 31, further comprising: receiving an indication of the respective offsets from the second UE.

Aspect 33: The method of any of aspects 27 through 32, further comprising: receiving, from a base station, an indication of a quantity of PRBs to be bundled together in the plurality of bundled PRBs, wherein the quantity is configured for a resource pool associated with the sidelink shared channel.

Aspect 34: The method of any of aspects 27 through 32, further comprising: receiving, from the second UE, an indication of a quantity of PRBs to be bundled together in the plurality of bundled PRBs, wherein multiple quantities for the plurality of bundled PRBs are configured for a resource pool associated with the sidelink shared channel.

Aspect 35: A method for wireless communication at a second UE, comprising: transmitting a sidelink message to a first UE over a sidelink shared channel that is associated with a feedback opportunity; determining that the first UE is configured to transmit feedback for the sidelink message via a plurality of bundled PRBs during a symbol of the feedback opportunity; and receiving the feedback for the sidelink message from the first UE via the plurality of bundled PRBs of the symbol of the feedback opportunity.

Aspect 36: The method of aspect 35, wherein receiving the feedback for the sidelink message further comprises: receiving the feedback for the sidelink message from the first UE via one or more additional symbols of the feedback opportunity in accordance with a frequency hopping pattern, wherein the feedback is transmitted during each of the one or more additional symbols via respective additional pluralities of bundled resource blocks.

Aspect 37: The method of any of aspects 35 through 36, wherein determining that the first UE is configured to transmit feedback for the sidelink message via the plurality of bundled PRBs further comprises: identifying a quantity of PRBs to be bundled together in the plurality of bundled PRBs; and determining the plurality of bundled PRBs based at least in part on the quantity, a starting PRB of the plurality of bundled PRBs, and a direction in a frequency domain in which the plurality of bundled PRBs extends from the starting PRB.

Aspect 38: The method of aspect 37, wherein identifying the quantity further comprises: transmitting, to the first UE, an indication of the quantity of the PRBs to be bundled together in the plurality of bundled PRBs.

Aspect 39: The method of any of aspects 35 through 36, wherein determining that the first UE is configured to transmit feedback for the sidelink message via the plurality of bundled PRBs further comprises: identifying a quantity of PRBs to be bundled together in the plurality of bundled PRBs; and determining the plurality of bundled PRBs based at least in part on the quantity and a respective offset for each of the PRBs to be bundled together in the plurality of bundled PRBs.

Aspect 40: The method of aspect 39, further comprising: transmitting an indication of the respective offsets to the first UE.

Aspect 41: The method of any of aspects 35 through 40, further comprising: receiving, from a base station, an indication of a quantity of PRBs to be bundled together in the plurality of bundled PRBs, wherein the quantity is configured for a resource pool associated with the sidelink shared channel.

Aspect 42: The method of any of aspects 35 through 40, further comprising: transmitting, to the first UE, an indication of a quantity of PRBs to be bundled together in the plurality of bundled PRBs, wherein multiple quantities for the plurality of bundled PRBs are configured for a resource pool associated with the sidelink shared channel.

Aspect 43: An apparatus for wireless communication at a first UE, comprising at least one processor; memory coupled to the at least one processor, the memory storing instructions executable by the at least one processor to cause the apparatus to perform a method of any of aspects 1 through 14.

Aspect 44: An apparatus for wireless communication at a first UE, comprising at least one means for performing a method of any of aspects 1 through 14.

Aspect 45: A non-transitory computer-readable medium storing code for wireless communication at a first UE, the code comprising instructions executable by a processor to perform a method of any of aspects 1 through 14.

Aspect 46: An apparatus for wireless communication at a second UE, comprising at least one processor; memory coupled to the at least one processor, the memory storing instructions executable by the at least one processor to cause the apparatus to perform a method of any of aspects 15 through 26.

Aspect 47: An apparatus for wireless communication at a second UE, comprising at least one means for performing a method of any of aspects 15 through 26.

Aspect 48: A non-transitory computer-readable medium storing code for wireless communication at a second UE, the code comprising instructions executable by a processor to perform a method of any of aspects 15 through 26.

Aspect 49: An apparatus for wireless communication at a first UE, comprising at least one processor; memory coupled to the at least one processor, the memory storing instructions executable by the at least one processor to cause the apparatus to perform a method of any of aspects 27 through 34.

Aspect 50: An apparatus for wireless communication at a first UE, comprising at least one means for performing a method of any of aspects 27 through 34.

Aspect 51: A non-transitory computer-readable medium storing code for wireless communication at a first UE, the code comprising instructions executable by a processor to perform a method of any of aspects 27 through 34.

Aspect 52: An apparatus for wireless communication at a second UE, comprising at least one processor; memory coupled to the at least one processor, the memory storing instructions executable by the at least one processor to cause the apparatus to perform a method of any of aspects 35 through 42.

Aspect 53: An apparatus for wireless communication at a second UE, comprising at least one means for performing a method of any of aspects 35 through 42.

Aspect 54: A non-transitory computer-readable medium storing code for wireless communication at a second UE, the code comprising instructions executable by a processor to perform a method of any of aspects 35 through 42.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies, including future systems and radio technologies, not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, phase change memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first user equipment (UE), comprising:
monitoring for a sidelink message from a second UE over a sidelink shared channel that is associated with a feedback opportunity that comprises a plurality of symbols;
determining a frequency hopping pattern for transmission of feedback via the plurality of symbols during the feedback opportunity;
determining a plurality of physical resource blocks for transmission of the feedback in accordance with the frequency hopping pattern, wherein each physical resource block of the plurality of physical resource blocks is associated with both a respective symbol of the plurality of symbols and a physical resource block index, wherein the physical resource block index is based at least in part on a physical resource block offset for the respective symbol; and
transmitting the feedback for the sidelink message to the second UE via the plurality of symbols of the feedback opportunity in accordance with the frequency hopping pattern.

2. The method of claim 1, wherein determining the frequency hopping pattern further comprises:
receiving, from a network node, an indication of the frequency hopping pattern.

3. The method of claim 1, wherein determining the frequency hopping pattern further comprises:
receiving, from a network node, one or more parameters to be used by the first UE in determining the frequency hopping pattern.

4. The method of claim 1, wherein determining the frequency hopping pattern further comprises:
determining the physical resource block index for each of the plurality of physical resource blocks based at least in part on an initial offset that is UE-specific and that applies to each of the plurality of symbols.

5. The method of claim 4, further comprising:
receiving an indication of the initial offset.

6. The method of claim 5, wherein receiving the indication of the initial offset comprises:
receiving the indication of the initial offset from the second UE, wherein the initial offset is UE-specific to the second UE.

7. The method of claim 5, further comprising:
transmitting, to the second UE, an additional indication of a preferred initial offset, wherein receiving the indication of the initial offset is based at least in part on transmitting the additional indication of the preferred initial offset.

8. The method of claim 4, further comprising:
selecting the initial offset at the first UE.

9. The method of claim 1, wherein determining the frequency hopping pattern further comprises:
applying a staircase algorithm wherein the physical resource block offset for each of the plurality of symbols increments by one physical resource block index per consecutive symbol of the plurality of symbols.

10. The method of claim 1, wherein determining the frequency hopping pattern further comprises:
applying a bit-reversal permutation algorithm wherein the physical resource block offset for each of the plurality of symbols is a reversal of a binary representation of each of the plurality of symbols.

11. The method of claim 1, further comprising:
receiving signaling indicating that an algorithm to be used by the first UE to determine the frequency hopping pattern is based at least in part on a resource pool associated with the sidelink shared channel.

12. The method of claim 1, further comprising:
receiving signaling indicating an algorithm to be used by the first UE to determine the frequency hopping pattern for all sidelink feedback channel communications associated with any sidelink resource pools.

13. A method for wireless communication at a second user equipment (UE), comprising:
transmitting a sidelink message to a first UE over a sidelink shared channel that is associated with a feedback opportunity that comprises a plurality of symbols;
determining a frequency hopping pattern for reception of feedback via the plurality of symbols during the feedback opportunity;
determining a plurality of physical resource blocks for reception of the feedback in accordance with the frequency hopping pattern, wherein each physical resource block of the plurality of physical resource blocks is associated with both a respective symbol of the plurality of symbols and a physical resource block index, wherein the physical resource block index is based at least in part on a physical resource block offset for the respective symbol; and
receiving the feedback for the sidelink message from the first UE via the plurality of symbols of the feedback opportunity in accordance with the frequency hopping pattern.

14. The method of claim 13, wherein determining the frequency hopping pattern further comprises:
determining the physical resource block index for each of the plurality of physical resource blocks based at least in part on an initial offset that is UE-specific and that applies to each of the plurality of symbols; and
transmitting an indication of the initial offset to the first UE, wherein the initial offset is UE-specific to the second UE.

15. The method of claim 14, further comprising:
receiving, from the first UE, an additional indication of a preferred initial offset, wherein transmitting the indication of the initial offset is based at least in part on receiving the additional indication of the preferred initial offset.

16. A method for wireless communication at a first user equipment (UE), comprising:
receiving an indication of a quantity of physical resource blocks to be bundled together in a plurality of bundled physical resource blocks, wherein the quantity is configured for a resource pool associated with a sidelink shared channel;
monitoring for a sidelink message from a second UE over the sidelink shared channel that is associated with a feedback opportunity;
determining that the first UE is configured to transmit feedback for the sidelink message via the plurality of bundled physical resource blocks during a symbol of the feedback opportunity; and transmitting the feedback for the sidelink message to the second UE via the plurality of bundled physical resource blocks of the symbol of the feedback opportunity.

17. The method of claim 16, wherein transmitting the feedback for the sidelink message further comprises:

transmitting the feedback for the sidelink message to the second UE via one or more additional symbols of the feedback opportunity in accordance with a frequency hopping pattern, wherein the feedback is transmitted during each of the one or more additional symbols over respective additional pluralities of bundled resource blocks.

18. The method of claim 16, wherein determining that the first UE is configured to transmit feedback for the sidelink message via the plurality of bundled physical resource blocks further comprises:

identifying the quantity of physical resource blocks to be bundled together in the plurality of bundled physical resource blocks; and determining the plurality of bundled physical resource blocks based at least in part on the quantity, a starting physical resource block of the plurality of bundled physical resource blocks, and a direction in a frequency domain in which the plurality of bundled physical resource blocks extends from the starting physical resource block.

19. The method of claim 16, wherein determining that the first UE is configured to transmit feedback for the sidelink message via the plurality of bundled physical resource blocks further comprises:

identifying the quantity of physical resource blocks to be bundled together in the plurality of bundled physical resource blocks; and determining the plurality of bundled physical resource blocks based at least in part on the quantity and a respective offset for each of the physical resource blocks to be bundled together in the plurality of bundled physical resource blocks.

20. The method of claim 19, further comprising:
receiving an indication of the respective offsets from the second UE.

21. The method of claim 16, further comprising:
wherein multiple quantities for the plurality of bundled physical resource blocks are configured for a resource pool associated with the sidelink shared channel.

22. A method for wireless communication at a second user equipment (UE), comprising:

transmitting, to a first UE, an indication of a quantity of physical resource blocks to be bundled together in a plurality of bundled physical resource blocks, wherein the quantity is configured for a resource pool associated with a sidelink shared channel;

transmitting a sidelink message to the first UE over the sidelink shared channel that is associated with a feedback opportunity;

determining that the first UE is configured to transmit feedback for the sidelink message via the plurality of bundled physical resource blocks during a symbol of the feedback opportunity; and receiving the feedback for the sidelink message from the first UE via the plurality of bundled physical resource blocks of the symbol of the feedback opportunity.

23. The method of claim 22, wherein receiving the feedback for the sidelink message further comprises:

receiving the feedback for the sidelink message from the first UE via one or more additional symbols of the feedback opportunity in accordance with a frequency hopping pattern, wherein the feedback is transmitted during each of the one or more additional symbols via respective additional pluralities of bundled resource blocks.

24. The method of claim 22, wherein determining that the first UE is configured to transmit feedback for the sidelink message via the plurality of bundled physical resource blocks further comprises:

identifying the quantity of physical resource blocks to be bundled together in the plurality of bundled physical resource blocks; and determining the plurality of bundled physical resource blocks based at least in part on the quantity, a starting physical resource block of the plurality of bundled physical resource blocks, and a direction in a frequency domain in which the plurality of bundled physical resource blocks extends from the starting physical resource block.

25. The method of claim 22, wherein determining that the first UE is configured to transmit feedback for the sidelink message via the plurality of bundled physical resource blocks further comprises:

identifying the quantity of physical resource blocks to be bundled together in the plurality of bundled physical resource blocks;

determining the plurality of bundled physical resource blocks based at least in part on the quantity and a respective offset for each of the physical resource blocks to be bundled together in the plurality of bundled physical resource blocks; and transmitting an indication of the respective offsets to the first UE.

* * * * *